United States Patent
Neumann

(10) Patent No.: US 11,501,386 B2
(45) Date of Patent: Nov. 15, 2022

(54) METHODS AND SYSTEMS FOR PHYSIOLOGICALLY INFORMED ACCOUNT METRICS UTILIZING ARTIFICIAL INTELLIGENCE

(71) Applicant: KPN Innovations, LLC, Lakewood, CO (US)

(72) Inventor: Kenneth Neumann, Lakewood, CO (US)

(73) Assignee: KPN INNOVATIONS, LLC., Lakewood, CO (US)

( * ) Notice: Subject to any disclaimer, the term of this patent is extended or adjusted under 35 U.S.C. 154(b) by 187 days.

(21) Appl. No.: 16/781,540

(22) Filed: Feb. 4, 2020

(65) Prior Publication Data

US 2021/0241381 A1    Aug. 5, 2021

(51) Int. Cl.
*G06Q 40/00* (2012.01)
*G06N 20/00* (2019.01)
*H04L 9/40* (2022.01)

(52) U.S. Cl.
CPC .......... *G06Q 40/12* (2013.12); *G06N 20/00* (2019.01); *H04L 63/08* (2013.01); *H04L 63/102* (2013.01)

(58) Field of Classification Search
CPC ....... H04L 63/08; H04L 63/102; H04L 29/06; G06N 20/00; G06Q 40/12; G06Q 40/00
USPC .......................................................... 705/30
See application file for complete search history.

(56) References Cited

U.S. PATENT DOCUMENTS

| | | | | |
|---|---|---|---|---|
| 8,323,232 | B2 * | 12/2012 | Bardy | A61M 37/0069 604/57 |
| 8,577,819 | B2 * | 11/2013 | Otto | G06Q 40/12 706/15 |
| 9,341,632 | B1 * | 5/2016 | Ahmad | A61B 5/083 |
| 9,445,757 | B2 * | 9/2016 | Desborough | A61B 5/6849 |
| 10,068,494 | B2 * | 9/2018 | Ahmad | G09B 5/02 |
| 10,282,789 | B1 | 5/2019 | Myers et al. | |
| 10,346,454 | B2 * | 7/2019 | Moeller-Bertram | G06K 9/6232 |
| 10,453,050 | B1 * | 10/2019 | Arumugam | G06Q 20/20 |
| 10,776,844 | B2 * | 9/2020 | Herring | G06Q 30/0633 |
| 10,846,622 | B2 * | 11/2020 | Neumann | G16B 50/30 |
| 10,853,697 | B2 * | 12/2020 | Chen | G06V 20/62 |
| 10,902,351 | B1 * | 1/2021 | Neumann | G06N 20/00 |
| 10,990,619 | B1 * | 4/2021 | Kuyda | G06F 16/31 |
| 11,005,839 | B1 * | 5/2021 | Shahidzadeh | H04L 63/18 |
| 11,112,933 | B2 * | 9/2021 | Khandelwal | H04N 21/47202 |

(Continued)

OTHER PUBLICATIONS

Retrieved from: https://emerj.com/ai-sector-overviews/artificial-intelligence-applications-lending-loan-management/.

*Primary Examiner* — Andrew Joseph Rudy
(74) *Attorney, Agent, or Firm* — Caldwell Intellectual Property Law

(57) ABSTRACT

A system for physiologically informed account metrics. The system includes a computing device configured to receive from a remote device operated by a third party, an account inquiry. The computing device is further configured to identify a biological extraction related to a particular user. The computing device is further configured to calculate a user account profile utilizing the biological extraction wherein the user account profile contains at least an element of user behavior data and at least an element of user hazard data. The computing device is further configured to generate an account machine-learning model and determine a response to the account inquiry utilizing an account metric.

20 Claims, 6 Drawing Sheets

(56) References Cited

U.S. PATENT DOCUMENTS

| | | | |
|---|---|---|---|
| 11,170,662 B2* | 11/2021 | Ahmad | G16H 40/63 |
| 2002/0091991 A1* | 7/2002 | Castro | G06F 9/06 |
| | | | 717/106 |
| 2018/0075527 A1 | 3/2018 | Nagla et al. | |
| 2018/0182029 A1 | 6/2018 | Vinay | |
| 2018/0314977 A1 | 11/2018 | Jiang et al. | |
| 2018/0349986 A1 | 12/2018 | Fidanza et al. | |
| 2018/0357714 A1 | 12/2018 | So et al. | |
| 2019/0108585 A1 | 4/2019 | Caldwell | |
| 2019/0180358 A1 | 6/2019 | Nandan et al. | |
| 2019/0180870 A1 | 6/2019 | Kartoun et al. | |
| 2019/0311438 A1 | 10/2019 | Hibler et al. | |
| 2019/0318421 A1 | 10/2019 | Lyonnet et al. | |
| 2019/0318422 A1 | 10/2019 | Roser et al. | |
| 2020/0098466 A1* | 3/2020 | Murdoch | G16H 20/60 |
| 2020/0168335 A1* | 5/2020 | Lassoued | G06N 20/00 |
| 2021/0004713 A1* | 1/2021 | Neumann | G06F 16/2455 |
| 2021/0004714 A1* | 1/2021 | Neumann | G06F 16/285 |
| 2021/0005316 A1* | 1/2021 | Neumann | G06F 40/35 |
| 2021/0020294 A1* | 1/2021 | Bharmi | G16H 50/30 |
| 2021/0050086 A1* | 2/2021 | Rose | G16H 10/60 |
| 2021/0057048 A1* | 2/2021 | Neumann | G16B 40/00 |
| 2021/0057100 A1* | 2/2021 | Neumann | G06K 9/6254 |
| 2021/0162261 A1* | 6/2021 | Neumann | G16H 40/67 |
| 2021/0183498 A1* | 6/2021 | Kalafut | G06T 7/0012 |
| 2021/0186342 A1* | 6/2021 | Bogdanovich | A61B 5/14517 |
| 2021/0190556 A1* | 6/2021 | Bogdanovich | G01D 21/02 |
| 2021/0228276 A1* | 7/2021 | Giraldez | G16H 20/40 |
| 2021/0233424 A1* | 7/2021 | Lemme | G16H 10/20 |
| 2021/0241133 A1* | 8/2021 | Neumann | G06N 20/00 |
| 2021/0241381 A1* | 8/2021 | Neumann | H04L 63/08 |
| 2021/0241872 A1* | 8/2021 | Neumann | G16H 50/20 |

* cited by examiner

METHODS AND SYSTEMS FOR PHYSIOLOGICALLY INFORMED ACCOUNT METRICS UTILIZING ARTIFICIAL INTELLIGENCE

FIELD OF THE INVENTION

The present invention generally relates to the field of artificial intelligence. In particular, the present invention is directed to methods and systems for physiologically informed account metrics utilizing artificial intelligence.

BACKGROUND

Account metrics can often be difficult to calculate as there are many factors to consider. Furthermore, factors utilized to measure and calculate account metrics frequently shift and change. Currently, there lacks an ability to calculate account metrics informed by physiological data.

SUMMARY OF THE DISCLOSURE

In an aspect, a system for physiologically informed account metrics utilizing artificial intelligence, the system comprising a computing device the computing device designed and configured to receive, from a remote device operated by a third party, an account inquiry, wherein the account inquiry identifies a particular user and an account operation related to the particular user. The computing device is further configured to identify a biological extraction related to the particular user, wherein the biological extraction further comprises at least an element of user physiological data. The computing device is further configured to calculate a user account profile utilizing the user biological extraction, wherein the user account profile contains at least an element of user behavior data and at least an element of user hazard data. The computing device is further configured to generate an account machine-learning model wherein the account machine-learning model utilizes a fiscal profile as an input and outputs an account metric. The computing device is further configured to determine a response to the account inquiry utilizing the account metric.

In an aspect, a method of physiologically informed account metrics utilizing artificial intelligence, the method comprising receiving, by a computing device, from a remote device operated by a third party, an account inquiry, wherein the account inquiry identifies a particular user and an account operation related to the particular user. The method further comprising identifying by the computing device, a biological extraction related to the particular user, wherein the biological extraction further comprises at least an element of user physiological data. The method further comprising calculating by the computing device, a user account profile utilizing the user biological extraction, wherein the user account profile contains at least an element of user behavior data and at least an element of user hazard data. The method further comprising generating by the computing device, an account machine-learning model wherein the account machine-learning model utilizes a fiscal profile as an input and outputs an account metric. The method further comprising determining by the computing device, a response to the account inquiry utilizing the account metric.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for physiologically informed account metrics. In an embodiment, a computing device receives from a remote device operated by a third party, an account inquiry. An account inquiry identifies a particular user and an account operation related to the particular user. For instance and without limitation, an account inquiry may contain a request for authorization for a car compensation for the user. A computing device identifies a biological extraction related to the user wherein the biological extraction contains at least an element of user physiological data. A computing device calculates a user account profile utilizing a user biological extraction. A computing device generates an account machine-learning model that utilizes a fiscal profile as an input and outputs an account metric. A computing device determines a response to an account inquiry utilizing an account metric.

Figure 1:
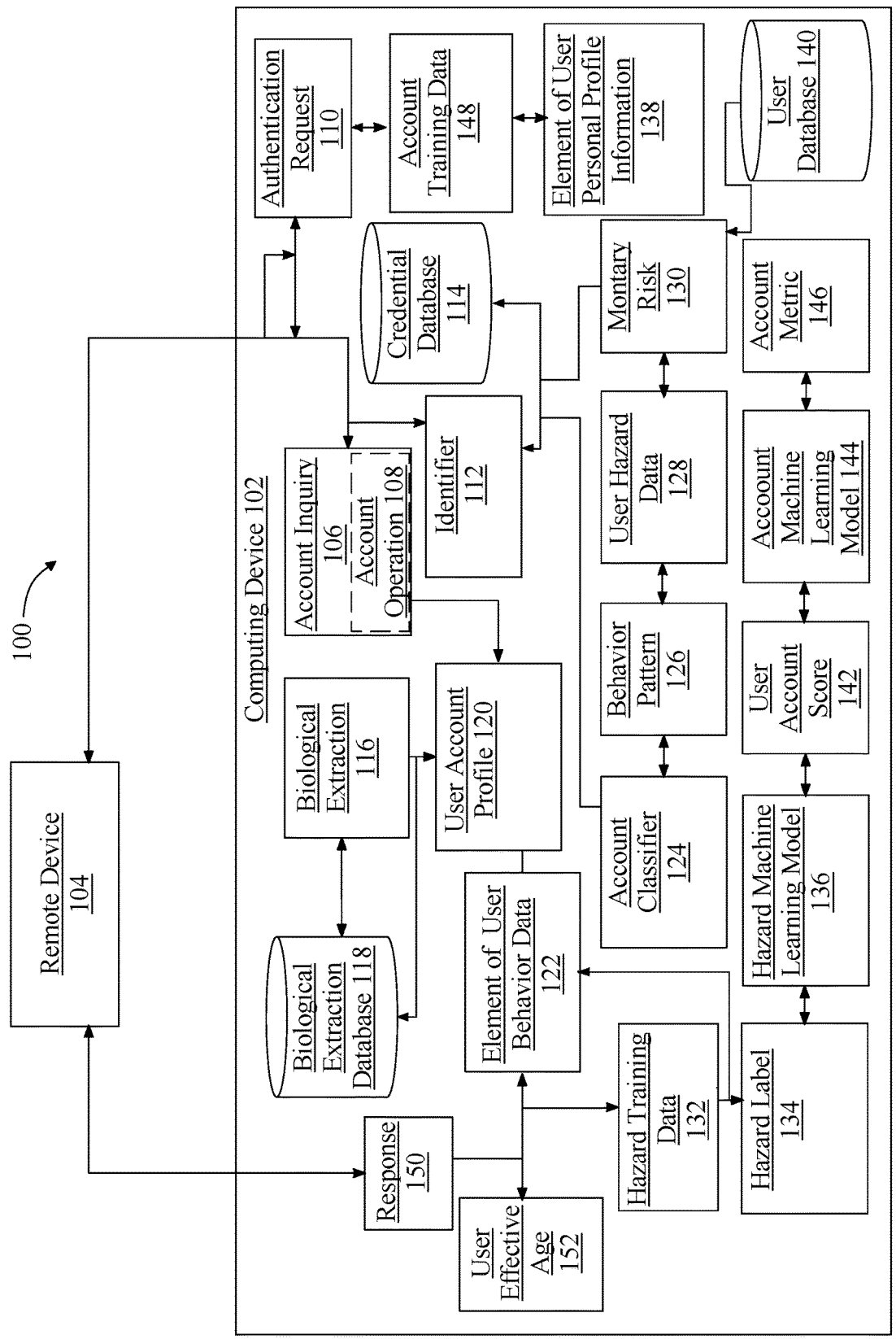
FIG. 1 is a block diagram illustrating an exemplary embodiment of a system for physiologically informed account metrics.

Referring now to FIG. 1, an exemplary embodiment of a system 100 for physiologically informed account metric is illustrated. System 100 includes a computing device 102. Computing device 102 may include any computing device 102 as described in this disclosure, including without limitation a microcontroller, microprocessor, digital signal processor (DSP) and/or system on a chip (SoC) as described in this disclosure. Computing device 102 may include, be included in, and/or communicate with a mobile device such as a mobile telephone or smartphone. Computing device 102 may include a single computing device 102 operating independently or may include two or more computing device 102 operating in concert, in parallel, sequentially or the like; two or more computing devices 102 may be included together in a single computing device 102 or in two or more computing devices 102. Computing device 102 may interface or communicate with one or more additional devices as described below in further detail via a network interface device. Network interface device may be utilized for connecting computing device 102 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices 102, and any combinations thereof. A network may employ a wired and/or a wireless mode of communication. In general, any network topology may be used. Information (e.g., data, software etc.) may be communicated to and/or from a computer and/or a computing device 102. Computing device 102 may include but is not limited to, for example, a computing device 102 or cluster of computing devices 102 in a first location and a second computing device 102 or cluster of computing devices 102 in a second location. Computing device 102 may include one or more computing devices 102 dedicated to data storage, security, distribution of traffic for load balancing, and the like. Computing device 102 may distribute one or more computing tasks as described below across a plurality of computing devices 102 of computing device 102, which may operate in parallel, in series, redundantly, or in any other manner used for distribution of tasks or memory between computing devices 102. Computing device 102 may be implemented using a "shared nothing" architecture in which data is cached at the worker; in an embodiment, this may enable scalability of system 100 and/or computing device 102.

Still referring to FIG. 1, computing device 102 may be designed and/or configured to perform any method, method step, or sequence of method steps in any embodiment described in this disclosure, in any order and with any degree of repetition. For instance, computing device 102 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 102 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, computing device 102 is configured to receive, from a remote device 104 operated by a third party, an account inquiry. Remote device 104 may include without limitation, a display in communication with computing device 102, where a display may include any display as described herein. Remote device 104 may include an additional computing device, such as a mobile device, laptop, desktop, computer and the like. Remote device 104 may be operated by a user, where a user may include any human being. Computing device 102 may receive a transmission from a remote device 104 utilizing any network methodology as described herein.

With continued reference to FIG. 1, computing device 102 is configured to receive from a remote device 104 operated by a third party, an account inquiry 106. An "account inquiry," as used in this disclosure, is an element of data describing any previous, current and/or future agreement or communication carried out between a customer and a vendor to acquire an asset for compensation. An account inquiry 106 may include a proposed agreement such as an acquisition where an article may be acquired for income. An account inquiry 106 may include a proposed agreement such as an account where a lender may give a user an amount of income to borrow in return for smaller repayments from a borrower to the lender over time with or without interest compensations. An account inquiry 106 may include a proposed bank agreement where a lender may give a large amount of income to a borrower for the acquisition of an article such as a house. An account inquiry 106 may include one or more proposed monetary deals from a bank such as an account and/or bank agreement. An account inquiry 106 may include a proposed request for an account balance card compensation. An account inquiry 106 may be received from a remote device 104 operated by a third party. A "third party," as used in this disclosure, includes any party other than a user who is and/or who may become a party to a fiscal arrangement with the user. A third party may include any individual, public or private group, and/or monetary institution that may make income available to a user that will be repaid. Repayment may include repayment of the principal amount and may include an interest charge. Repayment may occur in increments such as monthly or yearly compensations and/or may occur as a lump sum. For instance and without limitation, a third party may include a central bank such as for example the Federal Reserve Bank, a bank, an internet bank, a saving bank, an account balance union, an account balance association, a coverage company, an account balance card company, and the like.

With continued reference to FIG. 1, computing device 102 is configured to receive from a remote device 104 an account inquiry 106 that identifies a particular user and an account operation 108 related to the particular user. A "particular user," as used in this disclosure, is the identification of any human being who is seeking to enter into any monetary transaction with a third-party. For instance and without limitation, a particular user may identify a 27 year old female who is seeking a loan from her neighborhood branch bank in order to mortgage a house. In yet another non-limiting example, a particular user may identify a 57 year old male who is seeking to acquire a motorboat on his account credit card issued by an account credit card company. Computing device 102 receives an account inquiry 106 that contains an account operation 108 related to the particular user. A "account operation," as used in this disclosure, includes data describing any previous, current, and/or proposed monetary agreement between a particular user and a third-party. For example, an account operation 108 may describe an application by a sixteen year old male for a debit card to be issued from his neighborhood bank where he has a checking account. In yet another non-limiting example, an account operation 108 may describe an application by a twenty one year old female to a lender to refinance a student loan. In yet another non-limiting example, an account operation 108 may describe an application by a 67 year old male to obtain an automobile loan from a lending company.

With continued reference to FIG. 1, computing device 102 is configured to authenticate an account inquiry 106 to protect against stolen identities and potential credit thieves. Computing device 102 is configured to transmit to a remote device 104 operated by a third party an authentication request 110. An "authentication request," as used in this disclosure, is any request to prove an assertion, including the identity of a third-party remote device 104 and/or a particular user. An authentication request 110 may include a knowledge factor that may require a correct response to something a third-party may know such as a password, partial password, pass phrase, security question and/or personal identification number. An authentication request 110 may include an ownership factor that may require proof of something a third-party may have such as a wrist band, identification card, security token, implanted device, cell phone with built-in hardware token, software token, and/or remote device 104 containing a software token. An authentication request 110 may include an inherence factor that may require proof of a third-party and/or a particular user including for example a biometric identifier such as a fingerprint, retinal pattern, DNA sequence, signature, face, voice, unique bio-electric signals and the like. Computing device 102 may transmit a single factor authentication such as when only one factor is utilized to authenticate a third party. For example, a single factor authentication may occur when only a single knowledge factor such as a password is utilized to authenticate a third party. Computing device 102 may transmit a multi-factor authentication such as when a computing device 102 may require a third-party to authenticate a password and a software token or when a computing device 102 may require a third-party to authenticate a cryptographic public/private key pair in addition to a personal identification number (PIN). Computing device 102 receives an identifier 112 of a particular user. An "identifier," as used in this disclosure, is data describing information used to confirm the identity of a particular user. An identifier 112 may include the full name of the particular user, the address of the particular user, the phone number of the particular user, the social security number of the user, the driver's license number of the particular user, the passport number of the particular user, a universally unique identifier (UUID), a globally unique identifier (GUID), a universal identification number (UIN) of the particular user, a global identification number (GIN) of the particular user and the like. Computing device 102 validates an identifier 112 of the particular user. Computing device 102 may validate the identifier 112 of the particular user such as by comparing the received identifier 112 of the particular user to one or more stored identifier 112 contained within system 100. For example, computing device 102 may compare a received identifier 112 of a particular user that contains the user's social security number to a stored social security number for the user to determine the authenticity of the third-party and/or the particular user.

With continued reference to FIG. 1, system 100 may include a credential database 114. Credential database 114 may be implemented, without limitation, as a relational database, a key-value retrieval datastore such as a NOSQL database, or any other form or structure for use as a datastore that a person skilled in the art would recognize as suitable upon review of the entirety of this disclosure. Credential database 114 may contain one or more identifier 112 of a particular user as described below in more detail.

With continued reference to FIG. 1, computing device 102 is configured to identify a biological extraction 116 related to a particular user. A "biological extraction," as used in this disclosure, contains at least an element of user physiological data. As used in this disclosure, "physiological data" is any data indicative of a person's physiological state; physiological state may be evaluated with regard to one or more measures of health of a person's body, one or more systems within a person's body such as a circulatory system, a digestive system, a nervous system, or the like, one or more organs within a person's body, and/or any other subdivision of a person's body useful for diagnostic or prognostic purposes. For instance, and without limitation, a particular set of biomarkers, test results, and/or biochemical information may be recognized in a given medical field as useful for identifying various disease conditions or prognoses within a relevant field. As a non-limiting example, and without limitation, physiological data describing red blood cells, such as red blood cell count, hemoglobin levels, hematocrit, mean corpuscular volume, mean corpuscular hemoglobin, and/or mean corpuscular hemoglobin concentration may be recognized as useful for identifying various conditions such as dehydration, high testosterone, nutrient deficiencies, kidney dysfunction, chronic inflammation, anemia, and/or blood loss.

With continued reference to FIG. 1, physiological state data may include, without limitation, hematological data, such as red blood cell count, which may include a total number of red blood cells in a person's blood and/or in a blood sample, hemoglobin levels, hematocrit representing a percentage of blood in a person and/or sample that is composed of red blood cells, mean corpuscular volume, which may be an estimate of the average red blood cell size, mean corpuscular hemoglobin, which may measure average weight of hemoglobin per red blood cell, mean corpuscular hemoglobin concentration, which may measure an average concentration of hemoglobin in red blood cells, platelet count, mean platelet volume which may measure the average size of platelets, red blood cell distribution width, which measures variation in red blood cell size, absolute neutrophils, which measures the number of neutrophil white blood cells, absolute quantities of lymphocytes such as B-cells, T-cells, Natural Killer Cells, and the like, absolute numbers of monocytes including macrophage precursors, absolute numbers of eosinophils, and/or absolute counts of basophils. Physiological state data may include, without limitation, immune function data such as Interleukine-6 (IL-6), TNF-alpha, systemic inflammatory cytokines, and the like.

Continuing to refer to FIG. 1, physiological state data may include, without limitation, data describing blood-born lipids, including total cholesterol levels, high-density lipoprotein (HDL) cholesterol levels, low-density lipoprotein (LDL) cholesterol levels, very low-density lipoprotein (VLDL) cholesterol levels, levels of triglycerides, and/or any other quantity of any blood-born lipid or lipid-containing substance. Physiological state data may include measures of glucose metabolism such as fasting glucose levels and/or hemoglobin A1-C (HbA1c) levels. Physiological state data may include, without limitation, one or more measures associated with endocrine function, such as without limitation, quantities of dehydroepiandrosterone (DHEAS), DHEA-Sulfate, quantities of cortisol, ratio of DHEAS to cortisol, quantities of testosterone quantities of estrogen, quantities of growth hormone (GH), insulin-like growth factor 1 (IGF-1), quantities of adipokines such as adiponectin, leptin, and/or ghrelin, quantities of somatostatin, progesterone, or the like. Physiological state data may include measures of estimated glomerular filtration rate (eGFR). Physiological state data may include quantities of C-reactive protein, estradiol, ferritin, folate, homocysteine, prostate-specific Ag, thyroid-stimulating hormone, vitamin D, 25 hydroxy, blood urea nitrogen, creatinine, sodium, potassium, chloride, carbon dioxide, uric acid, albumin, globulin, calcium, phosphorus, alkaline phosphatase, alanine amino transferase, aspartate amino transferase, lactate dehydrogenase (LDH), bilirubin, gamma-glutamyl transferase (GGT), iron, and/or total iron binding capacity (TIBC), or the like. Physiological state data may include antinuclear antibody levels. Physiological state data may include aluminum levels. Physiological state data may include arsenic levels. Physiological state data may include levels of fibrinogen, plasma cystatin C, and/or brain natriuretic peptide.

Continuing to refer to FIG. 1, physiological state data may include measures of lung function such as forced expiratory volume, one second (FEV-1) which measures how much air can be exhaled in one second following a deep inhalation, forced vital capacity (FVC), which measures the volume of air that may be contained in the lungs. Physiological state data may include a measurement blood pressure, including without limitation systolic and diastolic blood pressure. Physiological state data may include a measure of waist circumference. Physiological state data may include body mass index (BMI). Physiological state data may include one or more measures of bone mass and/or density such as dual-energy x-ray absorptiometry. Physiological state data may include one or more measures of muscle mass. Physiological state data may include one or more measures of physical capability such as without limitation measures of grip strength, evaluations of standing balance, evaluations of gait speed, pegboard tests, timed up and go tests, and/or chair rising tests.

Still viewing FIG. 1, physiological state data may include one or more measures of cognitive function, including without limitation Rey auditory verbal learning test results, California verbal learning test results, NIH toolbox picture sequence memory test, Digital symbol coding evaluations, and/or Verbal fluency evaluations. Physiological state data may include one or more evaluations of sensory ability, including measures of audition, vision, olfaction, gustation, vestibular function and pain.

Continuing to refer to FIG. 1, physiological state data may include psychological data. Psychological data may include any data generated using psychological, neuro-psychological, and/or cognitive evaluations, as well as diagnostic screening tests, personality tests, personal compatibility tests, or the like; such data may include, without limitation, numerical score data entered by an evaluating professional and/or by a subject performing a self-test such as a computerized questionnaire. Psychological data may include textual, video, or image data describing testing, analysis, and/or conclusions entered by a medical professional such as without limitation a psychologist, psychiatrist, psychotherapist, social worker, a medical doctor, or the like. Psychological data may include data gathered from user interactions with persons, documents, and/or computing devices; for instance, user patterns of purchases, including electronic purchases, communication such as via chat-rooms or the like, any textual, image, video, and/or data produced by the subject, any textual image, video and/or other data depicting and/or describing the subject, or the like. Any psychological data and/or data used to generate psychological data may be analyzed using machine-learning and/or language processing module 136 as described in this disclosure.

Still referring to FIG. 1, physiological state data may include genomic data, including deoxyribonucleic acid (DNA) samples and/or sequences, such as without limitation DNA sequences contained in one or more chromosomes in human cells. Genomic data may include, without limitation, ribonucleic acid (RNA) samples and/or sequences, such as samples and/or sequences of messenger RNA (mRNA) or the like taken from human cells. Genetic data may include telomere lengths. Genomic data may include epigenetic data including data describing one or more states of methylation of genetic material. Physiological state data may include proteomic data, which as used herein is data describing all proteins produced and/or modified by an organism, colony of organisms, or system of organisms, and/or a subset thereof. Physiological state data may include data concerning a microbiome of a person, which as used herein includes any data describing any microorganism and/or combination of microorganisms living on or within a person, including without limitation biomarkers, genomic data, proteomic data, and/or any other metabolic or biochemical data useful for analysis of the effect of such microorganisms on other physiological state data of a person, as described in further detail below.

With continuing reference to FIG. 1, physiological state data may include one or more user-entered descriptions of a person's physiological state. One or more user-entered descriptions may include, without limitation, user descriptions of symptoms, which may include without limitation current or past physical, psychological, perceptual, and/or neurological symptoms, user descriptions of current or past physical, emotional, and/or psychological problems and/or concerns, user descriptions of past or current treatments, including therapies, nutritional regimens, exercise regimens, pharmaceuticals or the like, or any other user-entered data that a user may provide to a medical professional when seeking treatment and/or evaluation, and/or in response to medical intake papers, questionnaires, questions from medical professionals, or the like. Physiological state data may include any physiological state data, as described above, describing any multicellular organism living in or on a person including any parasitic and/or symbiotic organisms living in or on the persons; non-limiting examples may include mites, nematodes, flatworms, or the like. Examples of physiological state data described in this disclosure are presented for illustrative purposes only and are not meant to be exhaustive.

With continued reference to FIG. 1, physiological data may include, without limitation any result of any medical test, physiological assessment, cognitive assessment, psychological assessment, or the like. System 100 may receive at least a physiological data from one or more other devices after performance; system 100 may alternatively or additionally perform one or more assessments and/or tests to obtain at least a physiological data, and/or one or more portions thereof, on system 100. For instance, at least physiological data may include or more entries by a user in a form or similar graphical user interface object; one or more entries may include, without limitation, user responses to questions on a psychological, behavioral, personality, or cognitive test. For instance, at least a server 104 may present to user a set of assessment questions designed or intended to evaluate a current state of mind of the user, a current psychological state of the user, a personality trait of the user, or the like; at least a server 104 may provide user-entered responses to such questions directly as at least a physiological data and/or may perform one or more calculations or other algorithms to derive a score or other result of an assessment as specified by one or more testing protocols, such as automated calculation of a Stanford-Binet and/or Wechsler scale for IQ testing, a personality test scoring such as a Myers-Briggs test protocol, or other assessments that may occur to persons skilled in the art upon reviewing the entirety of this disclosure.

With continued reference to FIG. 1, assessment and/or self-assessment data, and/or automated or other assessment results, obtained from a third-party device; third-party device may include, without limitation, a server or other device (not shown) that performs automated cognitive, psychological, behavioral, personality, or other assessments. Third-party device may include a device operated by an informed advisor. An informed advisor may include any medical professional who may assist and/or participate in the medical treatment of a user. An informed advisor may include a medical doctor, nurse, physician assistant, pharmacist, yoga instructor, nutritionist, spiritual healer, meditation teacher, fitness coach, health coach, life coach, and the like.

With continued reference to FIG. 1, physiological data may include data describing one or more test results, including results of mobility tests, stress tests, dexterity tests, endocrinal tests, genetic tests, and/or electromyographic tests, biopsies, radiological tests, genetic tests, and/or sensory tests. Persons skilled in the art, upon reviewing the entirety of this disclosure, will be aware of various additional examples of at least a physiological sample consistent with this disclosure.

With continued reference to FIG. 1, physiological data may include one or more user body measurements. A "user body measurement" as used in this disclosure, includes a measurable indicator of the severity, absence, and/or presence of a disease state. A "disease state" as used in this disclosure, includes any harmful deviation from the normal structural and/or function state of a human being. A disease state may include any medical condition and may be associated with specific symptoms and signs. A disease state may be classified into different types including infectious diseases, deficiency diseases, hereditary diseases, and/or physiological diseases. For instance and without limitation, internal dysfunction of the immune system may produce a variety of different diseases including immunodeficiency, hypersensitivity, allergies, and/or autoimmune disorders.

With continued reference to FIG. 1, user body measurements may be related to particular dimensions of the human body. A "dimension of the human body" as used in this disclosure, includes one or more functional body systems that are impaired by disease in a human body and/or animal body. Functional body systems may include one or more body systems recognized as attributing to root causes of disease by functional medicine practitioners and experts. A "root cause" as used in this disclosure, includes any chain of causation describing underlying reasons for a particular disease state and/or medical condition instead of focusing solely on symptomatology reversal. Root cause may include chains of causation developed by functional medicine practices that may focus on disease causation and reversal. For instance and without limitation, a medical condition such as diabetes may include a chain of causation that does not include solely impaired sugar metabolism but that also includes impaired hormone systems including insulin resistance, high cortisol, less than optimal thyroid production, and low sex hormones. Diabetes may include further chains of causation that include inflammation, poor diet, delayed food allergies, leaky gut, oxidative stress, damage to cell membranes, and dysbiosis. Dimensions of the human body may include but are not limited to epigenetics, gut-wall, microbiome, nutrients, genetics, and/or metabolism.

With continued reference to FIG. 1, epigenetic, as used herein, includes any user body measurements describing changes to a genome that do not involve corresponding changes in nucleotide sequence. Epigenetic body measurement may include data describing any heritable phenotypic. Phenotype, as used herein, include any observable trait of a user including morphology, physical form, and structure. Phenotype may include a user's biochemical and physiological properties, behavior, and products of behavior. Behavioral phenotypes may include cognitive, personality, and behavior pattern 126. This may include effects on cellular and physiological phenotypic traits that may occur due to external or environmental factors. For example, DNA methylation and histone modification may alter phenotypic expression of genes without altering underlying DNA sequence. Epigenetic body measurements may include data describing one or more states of methylation of genetic material.

With continued reference to FIG. 1, gut-wall, as used herein, includes the space surrounding the lumen of the gastrointestinal tract that is composed of four layers including the mucosa, submucosa, muscular layer, and serosa. The mucosa contains the gut epithelium that is composed of goblet cells that function to secrete mucus, which aids in lubricating the passage of food throughout the digestive tract. The goblet cells also aid in protecting the intestinal wall from destruction by digestive enzymes. The mucosa includes villi or folds of the mucosa located in the small intestine that increase the surface area of the intestine. The villi contain a lacteal, that is a vessel connected to the lymph system that aids in removal of lipids and tissue fluids. Villi may contain microvilli that increase the surface area over which absorption can take place. The large intestine lack villi and instead a flat surface containing goblet cells are present.

With continued reference to FIG. 1, gut-wall includes the submucosa, which contains nerves, blood vessels, and elastic fibers containing collagen. Elastic fibers contained within the submucosa aid in stretching the gastrointestinal tract with increased capacity while also maintaining the shape of the intestine. Gut-wall includes muscular layer which contains smooth muscle that aids in peristalsis and the movement of digested material out of and along the gut. Gut-wall includes the serosa which is composed of connective tissue and coated in mucus to prevent friction damage from the intestine rubbing against other tissue. Mesenteries are also found in the serosa and suspend the intestine in the abdominal cavity to stop it from being disturbed when a person is physically active.

With continued reference to FIG. 1, gut-wall body measurement may include data describing one or more test results including results of gut-wall function, gut-wall integrity, gut-wall strength, gut-wall absorption, gut-wall permeability, intestinal absorption, gut-wall barrier function, gut-wall absorption of bacteria, gut-wall malabsorption, gut-wall gastrointestinal imbalances and the like.

With continued reference to FIG. 1, gut-wall body measurement may include any data describing blood test results of creatinine levels, lactulose levels, zonulin levels, and mannitol levels. Gut-wall body measurement may include blood test results of specific gut-wall body measurements including d-lactate, endotoxin lipopolysaccharide (LPS)

Gut-wall body measurement may include data breath tests measuring lactulose, hydrogen, methane, lactose, and the like. Gut-wall body measurement may include blood test results describing blood chemistry levels of albumin, bilirubin, complete blood count, electrolytes, minerals, sodium, potassium, calcium, glucose, blood clotting factors, With continued reference to FIG. 1, gut-wall body measurement may include one or more stool test results describing presence or absence of parasites, firmicutes, Bacteroidetes, absorption, inflammation, food sensitivities. Stool test results may describe presence, absence, and/or measurement of acetate, aerobic bacterial cultures, anerobic bacterial cultures, fecal short chain fatty acids, beta-glucuronidase, cholesterol, chymotrypsin, fecal color, *cryptosporidium* EIA, *Entamoeba histolytica*, fecal lactoferrin, *Giardia lamblia* EIA, long chain fatty acids, meat fibers and vegetable fibers, mucus, occult blood, parasite identification, phospholipids, propionate, putrefactive short chain fatty acids, total fecal fat, triglycerides, yeast culture, n-butyrate, pH and the like.

With continued reference to FIG. 1, gut-wall body measurement may include one or more stool test results describing presence, absence, and/or measurement of microorganisms including bacteria, archaea, fungi, protozoa, algae, viruses, parasites, worms, and the like. Stool test results may contain species such as *Bifidobacterium* species, *campylobacter* species, *Clostridium difficile, cryptosporidium* species, *Cyclospora cayetanensis, Cryptosporidium* EIA, *Dientamoeba fragilis, Entamoeba histolytica, Escherichia coli, Entamoeba histolytica, Giardia, H. pylori, Candida albicans, Lactobacillus* species, worms, macroscopic worms, mycology, protozoa, Shiga toxin *E. coli*, and the like.

With continued reference to FIG. 1, gut-wall body measurement may include one or more microscopic ova exam results, microscopic parasite exam results, protozoan polymerase chain reaction test results and the like. Gut-wall body measurement may include enzyme-linked immunosorbent assay (ELISA) test results describing immunoglobulin G (Ig G) food antibody results, immunoglobulin E (Ig E) food antibody results, Ig E mold results, IgG spice and herb results. Gut-wall body measurement may include measurements of calprotectin, eosinophil protein x (EPX), stool weight, pancreatic elastase, total urine volume, blood creatinine levels, blood lactulose levels, blood mannitol levels.

With continued reference to FIG. 1, gut-wall body measurement may include one or more elements of data describing one or more procedures examining gut including for example colonoscopy, endoscopy, large and small molecule challenge and subsequent urinary recovery using large molecules such as lactulose, polyethylene glycol-3350, and small molecules such as mannitol, L-rhamnose, polyethyleneglycol-400. Gut-wall body measurement may include data describing one or more images such as x-ray, MRI, CT scan, ultrasound, standard barium follow-through examination, barium enema, barium with contract, MRI fluoroscopy, positron emission tomography 9PET), diffusion-weighted MRI imaging, and the like.

With continued reference to FIG. 1, microbiome, as used herein, includes ecological community of commensal, symbiotic, and pathogenic microorganisms that reside on or within any of a number of human tissues and biofluids. For example, human tissues and biofluids may include the skin, mammary glands, placenta, seminal fluid, uterus, vagina, ovarian follicles, lung, saliva, oral mucosa, conjunctiva, biliary, and gastrointestinal tracts. Microbiome may include for example, bacteria, archaea, protists, fungi, and viruses. Microbiome may include commensal organisms that exist within a human being without causing harm or disease. Microbiome may include organisms that are not harmful but rather harm the human when they produce toxic metabolites such as trimethylamine. Microbiome may include pathogenic organisms that cause host damage through virulence factors such as producing toxic by-products. Microbiome may include populations of microbes such as bacteria and yeasts that may inhabit the skin and mucosal surfaces in various parts of the body. Bacteria may include for example Firmicutes species, Bacteroidetes species, Proteobacteria species, Verrumicrobia species, Actinobacteria species, Fusobacteria species, Cyanobacteria species and the like. Archaea may include methanogens such as *Methanobrevibacter* smithies' and *Methanosphaera stadtmanae*. Fungi may include *Candida* species and *Malassezia* species. Viruses may include bacteriophages. Microbiome species may vary in different locations throughout the body. For example, the genitourinary system may contain a high prevalence of *Lactobacillus* species while the gastrointestinal tract may contain a high prevalence of *Bifidobacterium* species while the lung may contain a high prevalence of *Streptococcus* and *Staphylococcus* species.

With continued reference to FIG. 1, microbiome body measurement may include one or more stool test results describing presence, absence, and/or measurement of microorganisms including bacteria, archaea, fungi, protozoa, algae, viruses, parasites, worms, and the like. Stool test results may contain species such as Ackerman's muciniphila, Anaerotruncus colihominis, bacteriology, *Bacteroides* vulgates', *Bacteroides-Prevotella*, Barnesiella species, *Bifidobacterium* longarm, *Bifidobacterium* species, *Butyrivibrio crossotus, Clostridium* species, Collinsella aerofaciens, fecal color, fecal consistency, *Coprococcus eutactus, Desulfovibrio piger, Escherichia coli, Faecalibacterium prausnitzii*, Fecal occult blood, Firmicutes to Bacteroidetes ratio, *Fusobacterium* species, *Lactobacillus* species, *Methanobrevibacter smithii*, yeast minimum inhibitory concentration, bacteria minimum inhibitory concentration, yeast mycology, fungi mycology, *Odoribacter* species, *Oxalobacter formigenes*, parasitology, *Prevotella* species, *Pseudoflavonifractor* species, *Roseburia* species, *Ruminococcus* species, *Veillonella* species and the like.

With continued reference to FIG. 1, microbiome body measurement may include one or more stool tests results that identify all microorganisms living a user's gut including bacteria, viruses, archaea, yeast, fungi, parasites, and bacteriophages. Microbiome body measurement may include DNA and RNA sequences from live microorganisms that may impact a user's health. Microbiome body measurement may include high resolution of both species and strains of all microorganisms. Microbiome body measurement may include data describing current microbe activity. Microbiome body measurement may include expression of levels of active microbial gene functions. Microbiome body measurement may include descriptions of sources of disease causing microorganisms, such as viruses found in the gastrointestinal tract such as raspberry bushy swarf virus from consuming contaminated raspberries or Pepino mosaic virus from consuming contaminated tomatoes.

With continued reference to FIG. 1, microbiome body measurement may include one or more blood test results that identify metabolites produced by microorganisms. Metabolites may include for example, indole-3-propionic acid, indole-3-lactic acid, indole-3-acetic acid, tryptophan, serotonin, kynurenine, total indoxyl sulfate, tyrosine, xanthine, 3-methylxanthine, uric acid, and the like.

With continued reference to FIG. 1, microbiome body measurement may include one or more breath test results that identify certain strains of microorganisms that may be present in certain areas of a user's body. This may include for example, lactose intolerance breath tests, methane-based breath tests, hydrogen based breath tests, fructose based breath tests. *Helicobacter pylori* breath test, fructose intolerance breath test, bacterial overgrowth syndrome breath tests and the like.

With continued reference to FIG. 1, microbiome body measurement may include one or more urinary analysis results for certain microbial strains present in urine. This may include for example, urinalysis that examines urine specific gravity, urine cytology, urine sodium, urine culture, urinary calcium, urinary hematuria, urinary glucose levels, urinary acidity, urinary protein, urinary nitrites, bilirubin, red blood cell urinalysis, and the like.

With continued reference to FIG. 1, nutrient as used herein, includes any substance required by the human body to function. Nutrients may include carbohydrates, protein, lipids, vitamins, minerals, antioxidants, fatty acids, amino acids, and the like. Nutrients may include for example vitamins such as thiamine, riboflavin, niacin, pantothenic acid, pyridoxine, biotin, folate, cobalamin, Vitamin C, Vitamin A, Vitamin D, Vitamin E, and Vitamin K. Nutrients may include for example minerals such as sodium, chloride, potassium, calcium, phosphorous, magnesium, sulfur, iron, zinc, iodine, selenium, copper, manganese, fluoride, chromium, molybdenum, nickel, aluminum, silicon, vanadium, arsenic, and boron.

With continued reference to FIG. 1, nutrients may include extracellular nutrients that are free floating in blood and exist outside of cells. Extracellular nutrients may be located in serum. Nutrients may include intracellular nutrients which may be absorbed by cells including white blood cells and red blood cells.

With continued reference to FIG. 1, nutrient body measurement may include one or more blood test results that identify extracellular and intracellular levels of nutrients. Nutrient body measurement may include blood test results that identify serum, white blood cell, and red blood cell levels of nutrients. For example, nutrient body measurement may include serum, white blood cell, and red blood cell levels of micronutrients such as Vitamin A, Vitamin B1, Vitamin B2, Vitamin B3, Vitamin B6, Vitamin B12, Vitamin B5, Vitamin C, Vitamin D, Vitamin E, Vitamin K1, Vitamin K2, and folate.

With continued reference to FIG. 1, nutrient body measurement may include one or more blood test results that identify serum, white blood cell and red blood cell levels of nutrients such as calcium, manganese, zinc, copper, chromium, iron, magnesium, copper to zinc ratio, choline, inositol, carnitine, methylmalonic acid (MMA), sodium, potassium, asparagine, glutamine, serine, coenzyme q10, cysteine, alpha lipoic acid, glutathione, selenium, eicosapentaenoic acid (EPA), docosahexaenoic acid (DHA), docosapentaenoic acid (DPA), total omega-3, lauric acid, arachidonic acid, oleic acid, total omega 6, and omega 3 index.

With continued reference to FIG. 1, nutrient body measurement may include one or more salivary test results that identify levels of nutrients including any of the nutrients as described herein. Nutrient body measurement may include hair analysis of levels of nutrients including any of the nutrients as described herein.

With continued reference to FIG. 1, genetic as used herein, includes any inherited trait. Inherited traits may include genetic material contained with DNA including for example, nucleotides. Nucleotides include adenine (A), cytosine (C), guanine (G), and thymine (T). Genetic information may be contained within the specific sequence of an individual's nucleotides and sequence throughout a gene or DNA chain. Genetics may include how a particular genetic sequence may contribute to a tendency to develop a certain disease such as cancer or Alzheimer's disease.

With continued reference to FIG. 1, genetic body measurement may include one or more results from one or more blood tests, hair tests, skin tests, urine, amniotic fluid, buccal swabs and/or tissue test to identify a user's particular sequence of nucleotides, genes, chromosomes, and/or proteins. Genetic body measurement may include tests that example genetic changes that may lead to genetic disorders. Genetic body measurement may detect genetic changes such as deletion of genetic material or pieces of chromosomes that may cause Duchenne Muscular Dystrophy. Genetic body measurement may detect genetic changes such as insertion of genetic material into DNA or a gene such as the BRCA1 gene that is associated with an increased risk of breast and ovarian cancer due to insertion of 2 extra nucleotides. Genetic body measurement may include a genetic change such as a genetic substitution from a piece of genetic material that replaces another as seen with sickle cell anemia where one nucleotide is substituted for another. Genetic body measurement may detect a genetic change such as a duplication when extra genetic material is duplicated one or more times within a person's genome such as with Charcot-Marie Tooth disease type 1. Genetic body measurement may include a genetic change such as an amplification when there is more than a normal number of copies of a gene in a cell such as HER2 amplification in cancer cells. Genetic body measurement may include a genetic change such as a chromosomal translocation when pieces of chromosomes break off and reattach to another chromosome such as with the BCR-ABL1 gene sequence that is formed when pieces of chromosome 9 and chromosome 22 break off and switch places. Genetic body measurement may include a genetic change such as an inversion when one chromosome experiences two breaks and the middle piece is flipped or inverted before reattaching. Genetic body measurement may include a repeat such as when regions of DNA contain a sequence of nucleotides that repeat a number of times such as for example in Huntington's disease or Fragile X syndrome. Genetic body measurement may include a genetic change such as a trisomy when there are three chromosomes instead of the usual pair as seen with Down syndrome with a trisomy of chromosome 21, Edwards syndrome with a trisomy at chromosome 18 or Patau syndrome with a trisomy at chromosome 13. Genetic body measurement may include a genetic change such as monosomy such as when there is an absence of a chromosome instead of a pair, such as in Turner syndrome.

With continued reference to FIG. 1, genetic body measurement may include an analysis of COMT gene that is responsible for producing enzymes that metabolize neurotransmitters. Genetic body measurement may include an analysis of DRD2 gene that produces dopamine receptors in the brain. Genetic body measurement may include an analysis of ADRA2B gene that produces receptors for noradrenaline. Genetic body measurement may include an analysis of 5-HTTLPR gene that produces receptors for serotonin. Genetic body measurement may include an analysis of BDNF gene that produces brain derived neurotrophic factor. Genetic body measurement may include an analysis of 9p21 gene that is associated with cardiovascular disease risk.

Genetic body measurement may include an analysis of APOE gene that is involved in the transportation of blood lipids such as cholesterol. Genetic body measurement may include an analysis of NOS3 gene that is involved in producing enzymes involved in regulating vaso-dilation and vaso-constriction of blood vessels.

With continued reference to FIG. 1, genetic body measurement may include ACE gene that is involved in producing enzymes that regulate blood pressure. Genetic body measurement may include SLCO1B1 gene that directs pharmaceutical compounds such as statins into cells. Genetic body measurement may include FUT2 gene that produces enzymes that aid in absorption of Vitamin B12 from digestive tract. Genetic body measurement may include MTHFR gene that is responsible for producing enzymes that aid in metabolism and utilization of Vitamin B9 or folate. Genetic body measurement may include SHMT1 gene that aids in production and utilization of Vitamin B9 or folate. Genetic body measurement may include MTRR gene that produces enzymes that aid in metabolism and utilization of Vitamin B12. Genetic body measurement may include MTR gene that produces enzymes that aid in metabolism and utilization of Vitamin B12. Genetic body measurement may include FTO gene that aids in feelings of satiety or fullness after eating. Genetic body measurement may include MC4R gene that aids in producing hunger cues and hunger triggers. Genetic body measurement may include APOA2 gene that directs body to produce ApoA2 thereby affecting absorption of saturated fats. Genetic body measurement may include UCP1 gene that aids in controlling metabolic rate and thermoregulation of body. Genetic body measurement may include TCF7L2 gene that regulates insulin secretion. Genetic body measurement may include AMY1 gene that aids in digestion of starchy foods. Genetic body measurement may include MCM6 gene that controls production of lactase enzyme that aids in digesting lactose found in dairy products. Genetic body measurement may include BCMO1 gene that aids in producing enzymes that aid in metabolism and activation of Vitamin A. Genetic body measurement may include SLC23A1 gene that produce and transport Vitamin C. Genetic body measurement may include CYP2R1 gene that produce enzymes involved in production and activation of Vitamin D. Genetic body measurement may include GC gene that produce and transport Vitamin D. Genetic body measurement may include CYP1A2 gene that aid in metabolism and elimination of caffeine. Genetic body measurement may include CYP17A1 gene that produce enzymes that convert progesterone into androgens such as androstenedione, androstenediol, dehydroepiandrosterone, and testosterone.

With continued reference to FIG. 1, genetic body measurement may include CYP19A1 gene that produce enzymes that convert androgens such as androstenedione and testosterone into estrogens including estradiol and estrone. Genetic body measurement may include SRD5A2 gene that aids in production of enzymes that convert testosterone into dihydrotestosterone. Genetic body measurement may include UFT2B17 gene that produces enzymes that metabolize testosterone and dihydrotestosterone. Genetic body measurement may include CYP1A1 gene that produces enzymes that metabolize estrogens into 2 hydroxy-estrogen. Genetic body measurement may include CYP1B1 gene that produces enzymes that metabolize estrogens into 4 hydroxy-estrogen. Genetic body measurement may include CYP3A4 gene that produces enzymes that metabolize estrogen into 16 hydroxy-estrogen. Genetic body measurement may include COMT gene that produces enzymes that metabolize 2 hydroxy-estrogen and 4 hydroxy-estrogen into methoxy estrogen. Genetic body measurement may include GSTT1 gene that produces enzymes that eliminate toxic by-products generated from metabolism of estrogens. Genetic body measurement may include GSTM1 gene that produces enzymes responsible for eliminating harmful by-products generated from metabolism of estrogens. Genetic body measurement may include GSTP1 gene that produces enzymes that eliminate harmful by-products generated from metabolism of estrogens. Genetic body measurement may include SOD2 gene that produces enzymes that eliminate oxidant by-products generated from metabolism of estrogens.

With continued reference to FIG. 1, metabolic, as used herein, includes any process that converts food and nutrition into energy. Metabolic may include biochemical processes that occur within the body. Metabolic body measurement may include blood tests, hair tests, skin tests, amniotic fluid, buccal swabs and/or tissue test to identify a user's metabolism. Metabolic body measurement may include blood tests that examine glucose levels, electrolytes, fluid balance, kidney function, and liver function. Metabolic body measurement may include blood tests that examine calcium levels, albumin, total protein, chloride levels, sodium levels, potassium levels, carbon dioxide levels, bicarbonate levels, blood urea nitrogen, creatinine, alkaline phosphatase, alanine amino transferase, aspartate amino transferase, bilirubin, and the like.

With continued reference to FIG. 1, metabolic body measurement may include one or more blood, saliva, hair, urine, skin, and/or buccal swabs that examine levels of hormones within the body such as 11-hydroxy-androsterone, 11-hydroxy-etiocholanolone, 11-keto-androsterone, 11-keto-etiocholanolone, 16 alpha-hydroxyestrone, 2-hydroxyestrone, 4-hydroxyestrone, 4-methoxyestrone, androstanediol, androsterone, creatinine, DHEA, estradiol, estriol, estrone, etiocholanolone, pregnanediol, pregnanetriol, specific gravity, testosterone, tetrahydrocortisol, tetrahydrocortisone, tetrahydrodeoxycortisol, allo-tetrahydrocortisol.

With continued reference to FIG. 1, metabolic body measurement may include one or more metabolic rate test results such as breath tests that may analyze a user's resting metabolic rate or number of calories that a user's body burns each day rest. Metabolic body measurement may include one or more vital signs including blood pressure, breathing rate, pulse rate, temperature, and the like. Metabolic body measurement may include blood tests such as a lipid panel such as low density lipoprotein (LDL), high density lipoprotein (HDL), triglycerides, total cholesterol, ratios of lipid levels such as total cholesterol to HDL ratio, insulin sensitivity test, fasting glucose test, Hemoglobin A1C test, adipokines such as leptin and adiponectin, neuropeptides such as ghrelin, pro-inflammatory cytokines such as interleukin 6 or tumor necrosis factor alpha, anti-inflammatory cytokines such as interleukin 10, markers of antioxidant status such as oxidized low-density lipoprotein, uric acid, paraoxonase 1. Persons skilled in the art, upon reviewing the entirety of this disclosure, will be aware of various additional examples of physiological state data that may be used consistently with descriptions of systems and methods as provided in this disclosure.

With continued reference to FIG. 1, physiological data may be obtained from a physically extracted sample. A "physical sample" as used in this example, may include any sample obtained from a human body of a user. A physical sample may be obtained from a bodily fluid and/or tissue analysis such as a blood sample, tissue, sample, buccal swab, mucous sample, stool sample, hair sample, fingernail sample and the like. A physical sample may be obtained from a device in contact with a human body of a user such as a microchip embedded in a user's skin, a sensor in contact with a user's skin, a sensor located on a user's tooth, and the like. Physiological data may be obtained from a physically extracted sample. A physical sample may include a signal from a sensor configured to detect physiological data of a user and record physiological data as a function of the signal. A sensor may include any medical sensor and/or medical device configured to capture sensor data concerning a patient, including any scanning, radiological and/or imaging device such as without limitation x-ray equipment, computer assisted tomography (CAT) scan equipment, positron emission tomography (PET) scan equipment, any form of magnetic resonance imagery (MRI) equipment, ultrasound equipment, optical scanning equipment such as photo-plethysmographic equipment, or the like. A sensor may include any electromagnetic sensor, including without limitation electroencephalographic sensors, magnetoencephalographic sensors, electrocardiographic sensors, electromyographic sensors, or the like. A sensor may include a temperature sensor. A sensor may include any sensor that may be included in a mobile device and/or wearable device, including without limitation a motion sensor such as an inertial measurement unit (IMU), one or more accelerometers, one or more gyroscopes, one or more magnetometers, or the like. At least a wearable and/or mobile device sensor may capture step, gait, and/or other mobility data, as well as data describing activity levels and/or physical fitness. At least a wearable and/or mobile device sensor may detect heart rate or the like. A sensor may detect any hematological parameter including blood oxygen level, pulse rate, heart rate, pulse rhythm, blood sugar, and/or blood pressure. A sensor may be configured to detect internal and/or external biomarkers and/or readings. A sensor may be a part of system 100 or may be a separate device in communication with system 100.

With continued reference to FIG. 1, computing device 102 may retrieve a biological extraction 116 related to a particular user from biological extraction database 118. Biological extraction database 118 may be implemented as any data structure suitable for use as credential database 114. Biological extraction database 118 may contain one or more biological extraction 116 pertaining to a user as described below in more detail.

With continued reference to FIG. 1, computing device 102 is configured to calculate a user account profile 120 utilizing a user biological extraction 116. A "user account profile," as used in this disclosure, is a compilation of data containing elements utilized by computing device 102 to calculate an account metric. Elements may include one or more indicators of a user's monetary patterns, risky behavior, demographics, household, other monetary obligations and the like. A user account profile 120 contains an element of user behavior data 122. An "element of user behavior data," as used in this disclosure, is data describing any concurrent and/or previous user behavior relating to any previous, current, and/or future account operation 108. For instance and without limitation, an element of user behavior data 122 may contain information describing a series of installment payments on a mortgage loan that a user missed paying. In yet another non-limiting example, an element of user behavior data 122 may contain information describing a history of credit card payments that were late or never paid.

With continued reference to FIG. 1, an element of user behavior data 122 may be identified by a user entry; for instance, and without limitation, a computing device 102 may provide a user with a questionnaire in the form of one or more data fields requesting that the user identify any previous, current, and/or future account operation 108. Questions presented to a user may ask for information from other previous third-parties that a user may have tried to seek funding and/or a loan from. Questions presented to a user may ask for names and addresses of other third-parties such as the name and address of a third-party that a user utilized to fund a car loan. In yet another non-limiting example, questions presented to a user may ask for previous bank statements, tax documents, checking account balance information, saving account information and the like. Questions presented to a user may ask one or more questions regarding how risk seeking and/or how risk averse a user acts in regard to monetary transactions.

With continued reference to FIG. 1, computing device 102 identifies an element of user behavior data 122 utilizing an account classifier 124. Computing device 102 is configured to receive a plurality of data entries containing at least an element of data pertaining to a previous user account operation 108. An "element of data pertaining to a previous user account operation," as used in this disclosure, is data describing any aspect of any previous account operation 108 that a user was involved in. An element of data pertaining to a previous user account operation 108 may describe a loan amount that a user applied for and was denied from. An element of data pertaining to a previous user account operation 108 may describe the timeliness of a series of payments made in response to a loan for wedding expenses. An element of data pertaining to a previous user account operation 108 may describe the amount of money that a user took out a second mortgage on a property.

With continued reference to FIG. 1, computing device 102 classifies using an account classifier 124, a plurality of data entries to a behavior pattern. A "classifier," as used in this disclosure, is a machine-learning model, such as a mathematical model, neural net, or program generated by a machine-learning algorithm known as a classification algorithm, that sorts inputs into categories or bins of data, outputting the categories or bins of data and/or labels associated therewith. A "account classifier," as used in this disclosure, is a classifier configured to input at least a previous user account metric and outputs a behavior pattern 126. Account classifier 124 may be generated using a classification algorithm, defined as a process whereby a computing device 102 derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. Training data includes any of the training data as described below in more detail. A "behavior pattern," as used in this disclosure, is data describing based on a level of analysis of a user's previous account operation 108, the creditworthiness of a particular user. A behavior pattern 126 may indicate the creditworthiness of a particular user by reflecting how likely the particular user is to repay debts. A behavior pattern 126 may indicate how likely a particular user is to pay back a loan based on a user's previous account operation 108. A behavior pattern 126 may indicate creditworthiness based on monetary amounts and/or quantities of previous account operation 108. A behavior pattern 126 may indicate creditworthiness based on previously calculated credit scores. Computing device 102 identifies an element of user behavior data 122 utilizing an output behavior pattern 126. In an embodiment, an element of user behavior data 122 may contain any information contained within a behavior pattern 126.

With continued reference to FIG. 1, computing device 102 is configured to calculate a user account profile 120 to contain at least an element of user hazard data 128. "User hazard data," as used in this disclosure, is data describing a user's predisposition to monetary risk 130 based on a user's biological extraction 116. A "monetary risk," as used in this disclosure, is any type of risk associated with financing, including any monetary transaction that puts a user in risk of default. Monetary risk 130 may include market risk, liquidity risk, concentration risk, credit risk, reinvestment risk, inflation risk, horizon risk, longevity risk, income risks, expense risks, investment and asset risks, debit and/or credit card risks. For example, monetary risk 130 may include an income risk that may be caused by death, disability, unemployment, and/or aging. Monetary risk 130 may include an expense risk that may be caused by high expense, and/or an emergency expense. Monetary risk 130 may include an investment and/or asset risk that may be caused by risky investments, inflation, depreciation, destruction, and/or theft. Monetary risk 130 may include a debit and/or credit card risk caused by too much debt, bad debt, and/or bad credit scores.

With continued reference to FIG. 1, computing device 102 is configured to retrieve a second biological extraction 116 related to a particular user. Computing device 102 may retrieve a second biological extraction 116 from biological extraction database 118. Computing device 102 is configured to receive hazard training data 132. "Hazard training data," as used in this disclosure, is training data that contains a plurality of biological extraction 116 and a plurality of hazard labels. "Training data," as used in this disclosure, is data containing correlations that a machine-learning process may use to model relationships between two or more categories of data elements. For instance, and without limitation, training data may include a plurality of data entries, each entry representing a set of data elements that were recorded, received, and/or generated together; data elements may be correlated by shared existence in a given data entry, by proximity in a given data entry, or the like. Multiple data entries in training data may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data according to various correlations; correlations may indicate causative and/or predictive links between categories of data elements, which may be modeled as relationships such as mathematical relationships by machine-learning processes as described in further detail below. Training data may be formatted and/or organized by categories of data elements, for instance by associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements; for instance, and without limitation, training data may be provided in fixed-length formats, formats linking positions of data to categories such as comma-separated value (CSV) formats and/or self-describing formats such as extensible markup language (XML), enabling processes or devices to detect categories of data.

Alternatively or additionally, and still referring to FIG. 1, training data may include one or more elements that are not categorized; that is, training data may not be formatted or contain descriptors for some elements of data. Machine-learning algorithms and/or other processes may sort training data according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data to be made applicable for two or more distinct machine-learning algorithms as described in further detail below. Training data used by computing device 102 may correlate any input data as described in this disclosure to any output data as described in this disclosure.

With continued reference to FIG. 1, a "hazard label," as used in this disclosure, is data describing an indication as to a user's predisposition to monetary risk 130 based on a user's biological extraction 116. In an embodiment, a user's predisposition to monetary risk 130 may be graded on a continuum. For example, a user who shows no predisposition to monetary risk 130 may be given a hazard label 134 that indicates very low predisposition to monetary risk 130 while a user who shows some predisposition to monetary risk 130 may be given a hazard label 134 that indicates moderate predisposition to monetary risk 130, and a user who shows a great deal of predisposition to monetary risk 130 may be given a hazard label 134 that indicates high predisposition to monetary risk 130.

With continued reference to FIG. 1, computing device 102 is configured to utilize hazard training data 132 to generate a hazard machine-learning model 136. A "hazard machine-learning model," as used in this disclosure, is a machine-learning model that utilizes a second biological extraction 116 related to a particular user as an input and outputs a hazard label 134. A machine-learning model, as used herein, is a mathematical representation of a relationship between inputs and outputs, as generated using any machine-learning process including without limitation any process as described above, and stored in memory; an input is submitted to a machine-learning model once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model may be generated by creating an artificial neural network, such as a convolutional neural network comprising an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

With continued reference to FIG. 1, a machine-learning process, also referred to as a machine-learning algorithm, is a process that automatedly uses training data and/or a training set as described above to generate an algorithm that will be performed by a computing device 102 and/or module to produce outputs given data provided as inputs; this is in contrast to a non-machine-learning software program where the commands to be executed are determined in advance by a user and written in a programming language.

Continuing to refer to FIG. 1, machine-learning algorithms may be implemented using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure, Still referring to FIG. 1, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

With continued reference to FIG. 1, models may be generated using alternative or additional artificial intelligence methods, including without limitation by creating an artificial neural network, such as a convolutional neural network comprising an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. This network may be trained using training data.

Still referring to FIG. 1, machine-learning algorithms may include supervised machine-learning algorithms. Supervised machine-learning algorithms, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised machine-learning process may include a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data. Persons skilled in the art, upon reviewing the entirety of this disclosure, will be aware of various possible variations of supervised machine-learning algorithms that may be used to determine relation between inputs and outputs.

With continued reference to FIG. 1, supervised machine-learning processes may include classification algorithms, defined as processes whereby a computing device 102 derives, from training data, a model for sorting inputs into categories or bins of data. Classification may be performed using, without limitation, linear classifiers such as without limitation logistic regression and/or naive Bayes classifiers, nearest neighbor classifiers including without limitation k-nearest neighbors classifiers, support vector machines, decision trees, boosted trees, random forest classifiers, and/or neural network-based classifiers.

Still referring to FIG. 1, machine-learning processes may include unsupervised processes. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like. Unsupervised machine-learning algorithms may include, without limitation, clustering algorithms and/or cluster analysis processes, such as without limitation hierarchical clustering, centroid clustering, distribution clustering, clustering using density models, subspace models, group models, graph-based models, signed graph models, neural models, or the like. Unsupervised learning may be performed by neural networks and/or deep learning protocols as described above.

With continued reference to FIG. 1, computing device 102 identifies an element of user hazard data 128 that may be contained within fiscal profile utilizing a hazard label 134. In an embodiment, an element of user hazard data 128 may include a hazard label 134. In yet another non-limiting example, an element of user hazard data 128 may include a second biological extraction 116 utilized to generate hazard machine-learning model 136.

With continued reference to FIG. 1, computing device 102 is configured to calculate a user account profile 120 to contain an element of user personal profile information 138. "User personal profile information," as used in this disclosure, is any data that describes any information relating to an identifiable person. An element of personal profile information may include demographic information such as the age, gender, income, marital status, home address, allergies, educational background, medical diagnoses, medical history, and the like. An element of personal profile information may include data that describes well thought-out decisions, and consistent behavior of a user. Consistent behavior may include indicators that show continued employment, stable income, carrying little debt, maintaining a home, having continued access to transportation, residing and/or working in safe neighborhoods and areas, access to parks and playgrounds, walkability of where someone lives. Consistent behavior may include one or more markers of a user's education including literacy, languages spoken, early childhood education, vocational training, and higher education. Consistent behavior may include one or more markers of nutrition that reflect little experienced hunger, ability to consume fresh produce, and access to healthy options. An element of user personal profile information 138 may include any data describing any behavior that indicates integration and/or engagement with a local community. Local communities may include any social unit that shares one or more common norms, religion, values, customs and/or identity. Local communities may share a sense of place situated in a given geographical area and/or share a virtual space through communication platforms. Local communities may be based on location such as communities of place that range from local neighborhoods, suburbs, villages, towns, cities, regions, nations, and/or planet as a whole. Local communities may be identity based communities including local cliques, sub-cultures, ethnic groups, religions, multicultural and/or pluralistic civilizations and the like. Local communities may be based on family and/or network based guilds such as incorporated associations, political decision making structures, economic enterprises, and/or professional associations. An element of user personal profile information 138 may indicate any social integration, support systems, and/or community engagement that a user has participated in. For instance and without limitation, an element of user personal profile information 138 may indicate that a user engages in a weekly choir group or volunteers once per month at a soup kitchen. Computing device 102 may calculate a user account profile 120 to contain at least an element of user personal profile information 138. An element of user personal profile information 138 contained within a user account profile 120 may be utilized to generate an account machine-learning model as described below in more detail. One or more elements of user personal profile information may be stored within user database 140. User database 140 may be implemented as any data structure suitable for use as credential database 114 as described below in more detail.

With continued reference to FIG. 1, computing device 102 is configured to calculate a user account profile 120 to contain a user account score 142. A "user account score," as used in this disclosure, is any textual, numerical, and/or symbolic data representing one or more indicators of creditworthiness. Creditworthiness may reflect how likely a user is to default on any debts and/or how worth a user may be to receive new credit. Creditworthiness may reflect how likely a user is to repay a debt. Creditworthiness may be utilized to approximate how suitable a user is for a loan or how likely it is that you will be able to make payments on a loan. A user account score 142 may include an account history factor, an outstanding account factor, an account length factor, and/or an account type factor. A "account history factor," as used in this disclosure, is any data that contains information pertaining to a user's previous fiscal inquires and/or previous account operation 108. An account history factor may contain information that describes if a user has made payments on time, how often a user missed payments, how many days past due a user paid bills, and how recently a payment may have been missed. For example, an account history factor may indicate that a user paid three credit card bills on time and in full over the course of the past three months. In yet another non-limiting example, an account history factor may indicate that a user missed payment on one installment payment on a user's mortgage but has paid every other payment on time. An "outstanding account factor," as used in this disclosure, is any data that contains information describing any outstanding monetary balances. An outstanding monetary balance may include any credit limit that has been utilized. For example, an outstanding monetary balance may include a credit card bill that has not been paid off in full or a monetary loan that has a balance still owed. An outstanding account factor may include a breakdown of credit utilization that may reflect the amount of a user's credit limit that has been utilized. An outstanding account factor may be based on an entire monetary amount that a user owes, the number and types of accounts that a user has available, and/or the proportion of money owed compared to how much credit is available. A "account length factor," as used in this disclosure, is any data that contains information describing the length of any current or previous account operation 108, and/or the length of any current or previous fiscal inquiries. For example, an account length factor may indicate that a user has a history of making timely payments. In yet another non-limiting example, an account length factor may indicate that a user has a very brief and short history of making timely payments. A "account type factor," as used in this disclosure, is data describing any type of fiscal inquiries that a user is currently engaged with. An account type factor may describe any open accounts, installment loans, home loans, retail credit cards, credit cards and the like. An account type factor may describe that a user has a home loan and a credit card loan. In yet another non-limiting example, an account type factor may describe that a user has two separate mortgage installment loans. In an embodiment, a user account score 142 may be calculated based on combining one or more factors. In an embodiment, user account score 142 may be calculated by multiplying an account history factor, an outstanding account factor, an account length factor, and an account type factor together to produce one final sum. In an embodiment, a user account score 142 may be calculated by adding an account history factor, an outstanding account factor, an account length factor, and an account type factor together to produce a user account score 142. In an embodiment, one or more factors may be subtracted, and/or divided together based on one or more expert inputs regarding the best way to calculate a user account score.

With continued reference to FIG. 1, computing device 102 is configured to generate an account machine-learning model 144. A "account machine-learning model," as used in this disclosure, is a machine-learning model that utilizes a fiscal profile as an input and outputs an account metric 146. Account machine-learning model 144 includes any of the machine-learning models as described above. An "account metric," as used in this disclosure, is any textual, pictorial, and/or character data that reflects the monetary well-being and/or monetary stability of a particular user. An account metric 146 may contain an indication as to the credit worthiness of a user such as how much risk a lender may take when a user borrows money. An account metric 146 may contain a numerical number indicating a certain dollar amount and/or dollar limit that a user is approved for. An account metric 146 may contain a determination of a user's credit risk. An account metric 146 may reflect a likelihood of a user to repay debt responsibly based on a user's past credit history and current credit status. For instance and without limitation, an account metric 146 may indicate that a user earns a stable income and has ample money in his bank account to cover a loan of up to $500,000. In yet another non-limiting example, an account metric 146 may describe a user as not being particularly monetarily worthy because the user does not have a stable job, has seasonal employment and does not have a history of making payments on time. Computing device 102 generates account machine-learning model 144 utilizing account training data 148. "Account training data," as used in this disclosure, is training data that contains a plurality of fiscal profiles and a plurality of correlated account metric 146. Training data includes any of the training data as described above. Computing device 102 is configured to receive account training data 148. Computing device 102 generates account machine-learning model 144 utilizing account training data 148 and a first machine-learning algorithm.

With continued reference to FIG. 1, computing device 102 is configured to determine a response 150 to an account inquiry 106 utilizing an account metric 146. A "response," as used in this disclosure, is any textual, numerical, and/or character data generated in reply to an account inquiry 106. A response 150 may contain an answer to a question contained within an account inquiry 106. A response 150 may contain an approval of a requested purchase, loan, mortgage, line of credit and the like contained within an account inquiry 106. A response 150 may contain a denial of a requested purchase, loan, mortgage, line of credit and the like contained within an account inquiry 106. A response 150 may contain a modified loan amount, mortgage amount, line of credit, and the like. A modification may include an increased approval amount for a request contained within an account inquiry 106 and/or a decreased approval amount for a request contained within an account inquiry 106. For example, a response 150 may contain a denial of a requested purchase of $50,000 because an account metric 146 indicates that a user is a risky investment seeker and has a genetic mutation to monoamine oxidase A gene making the user more likely to carry large amounts of debt.

With continued reference to FIG. 1, computing device 102 is configured to determine if account inquiry 106 is in excess of an account metric 146 and deny the account inquiry 106. For example, computing device 102 may determine that an account inquiry 106 for a $100,000 loan is in excess of an account metric 146 that indicates the user has a network of $20,000 and has a genetic tendency to be a risk taker. Computing device 102 is configured to determine that an account inquiry 106 does not exceed an account metric 146 and approve an account inquiry 106. For instance and without limitation, computing device 102 may determine that an account inquiry 106 to make a $5000 credit card purchase does not exceed an account metric 146 that determines that a user has a stable income, does not have a predisposition to impulsivity, and only utilizes 5% of his total credit limit on average each month.

With continued reference to FIG. 1, computing device 102 may determine a response to an account inquiry 106 utilizing a calculated user effective age 152. A "user effective age 152," as used in this disclosure, is an age of a user as adjusted to reflect a life expectancy that differs from an actuarially projected life expectancy. For instance, a user effective age 152 of a person predicted to live fewer years than actuarially projected may be higher than a user effective age 152 of a person predicted to match and/or exceed an actuarially projected life expectancy. User effective age 152 may be used as a representation of a user's likely overall state of health, inasmuch as a user's likelihood to exceed or fall short of actuarially projected life expectancy may be closely linked to a user's state of health. A user's "chronological age," as defined in this disclosure, is an age of the user as measured in years, or other units of time, from the date of the user's birth to the date of the measurement, where a "date" may include any calendar date, Julian date, or the like. A chronological age may be used to project a user's "actuarial life expectancy," defined as a probable age of death, as predicted using any actuarial method and/or table, and/or an interval from a date such as the present date to the probable age of death; actuarial methods may include looking up and/or calculating a user's life expectancy using date of birth and/or demographic information about the user such as sex, ethnicity, geographic location, nationality, or the like. A user effective age 152 may be calculated based on a user's chronological age and a user's biological extraction 116. For instance and without limitation, computing device 102 may add several years to a user's chronological age to output an effective age that is older than a user's chronological age when a user's biological extraction 116 contains abnormal findings or a laboratory finding that is outside of normal limits. In yet another non-limiting example, computing device 102 may subtract several years to a user's chronological age to output an effective age that is younger than a user's chronological age when a user's biological extraction 116 contains normal findings or a laboratory finding that is within and/or below normally accepted limits.

With continued reference to FIG. 1, user effective age 152 may be calculated by multiplying a telomer length factor by an endocrinal factor multiplied by a histone variance factor to produce a positive effective age score. A "telomer length factor," as used in this disclosure, is a factor that may be multiplied by a user's chronological age to reflect an effect that telomeric length and/or a change in telomere length has on the user's effective age. Calculation may include prediction of a variance from actuarial life expectancy for a given person, as defined above, as determined based on telomeric length and/or variation in telomere length. A difference between these two values may be added to a user chronological age and then divided by the user chronological age to calculate a "raw" factor, for instance as described above; this may then be multiplied by a weight to determine the telomer length factor, whereas above the weight may be calculated to offset relatedness between telomere length and/or change in telomere length and other elements used to calculate age factors as described herein, such as endocrinal age factors. A computing device 102 may determine telomer length factor by retrieving telomer length factor from user database 140. User database 140 may be implemented, without limitation, as a relational database, a key-value retrieval datastore such as a NOSQL database, or any other form or structure for use as a datastore that a person skilled in the art would recognize as suitable upon review of the entirety of this disclosure. For instance, and without limitation, one or more experts may enter data in user database 140 indicative of an effect on user life expectancy; such data may, for instance, be entered as described in further detail below.

With continued reference to FIG. 1, an "endocrinal factor," as used in this disclosure, is a factor that may be multiplied by a user's chronological age to reflect an effect that endocrinal data has on the user's effective age. Endocrinal data may include any physiological data relating to the endocrine system. The endocrine system includes glands that include the pineal gland, the thyroid gland, the parathyroid gland, the pituitary gland, the adrenal gland, the pancreas, the ovaries, and the testis. Endocrinal data may include one or more measurements of function of the endocrine system such as for example, a measurement of thyroid stimulating hormone (TSH) or a fasting serum insulin level. Calculation of an endocrinal factor may include any calculation for telomer length factor as described above.

With continued reference to FIG. 1, a "histone variance factor," as used in this disclosure, is a factor that may be multiplied by a user's chronological age to reflect an effect that loss of histones has on the user's effective age. Histones include alkaline proteins found in cell nuclei that package and order DNA into nucleosomes. Histones are the primary component of chromatin, maintaining a role in gene regulation. Histone loss may be linked with cell division, as reduced synthesis of new histones has been seen to be correlated with shortened telomeres that activate a DNA damage response. Loss of core histones include H2A, H2B, H3, and H4 may be considered an epigenetic mark of aging. Calculation of a histone variance factor may include any calculation for telomer length factor as described above.

With continued reference to FIG. 1, computing device 102 may utilize a user effective age 152 in combination with an account metric 146 to determine a response to an account inquiry 106. For example, computing device 102 may utilize a user effective age 152 to determine a loan request amount, and/or the length of repayment of a particular monetary inquiry. For instance and without limitation, a user effective age 152 that indicates a user who has a chronological age of 75 and has a user effective age 152 of 55 may be a suitable candidate for a twenty year mortgage loan, and as such computing device 102 may generate a response that indicates the user is approved for a twenty year loan in combination with a user's account metric 146 that indicates that the user is monetarily secure. In yet another non-limiting example, a user effective age 152 that indicates a user who has a chronological age of 57 and has a user effective age of 77 may not be a suitable candidate for a credit high credit limit because of the user's advanced effective age and the unlikeliness of the user to be able to pay back a high loan amount.

Figure 2:
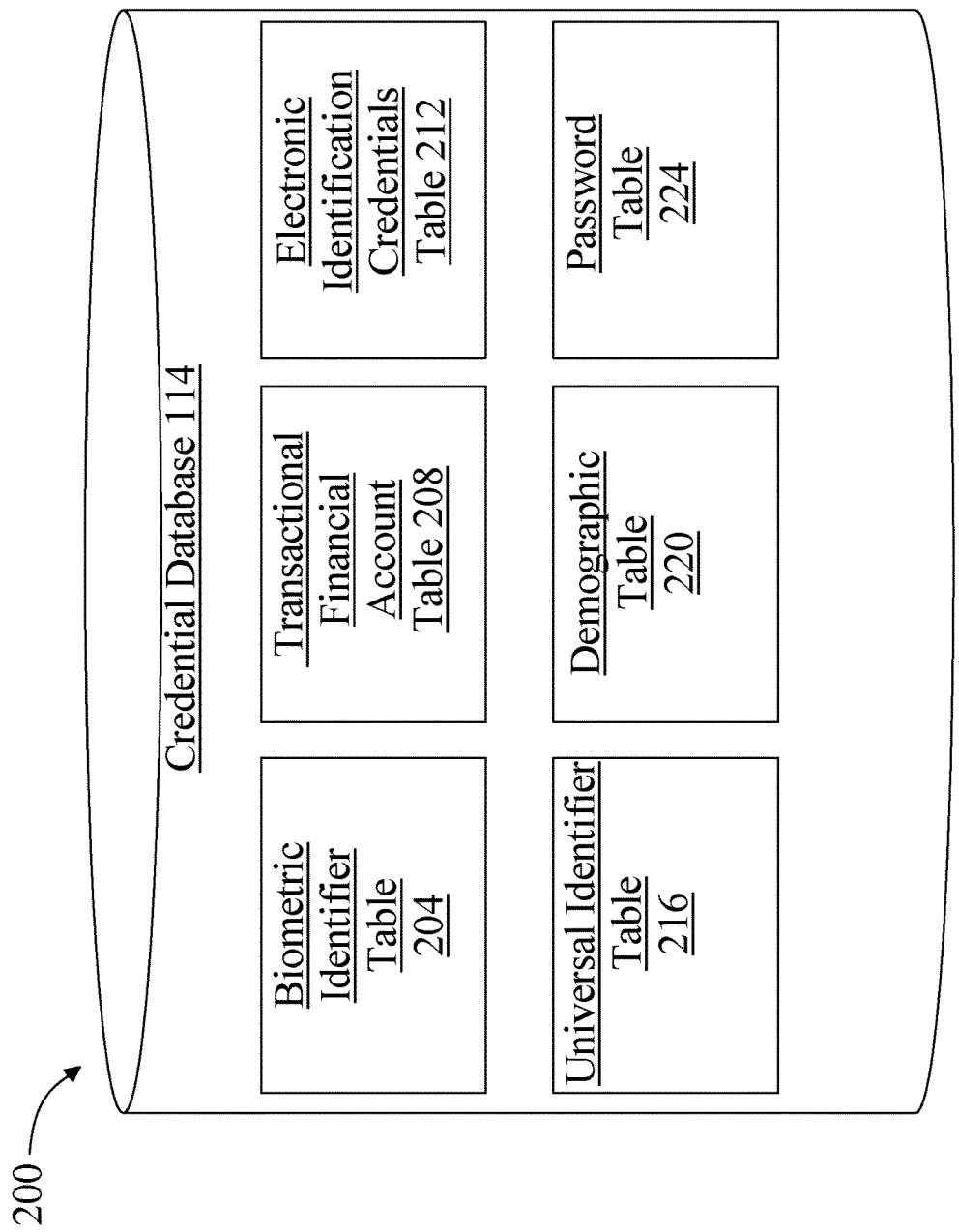
FIG. 2 is a block diagram illustrating an exemplary embodiment of a credential database.

Referring now to FIG. 2, an exemplary embodiment 200 of credential database 114 is illustrated. Credential database 114 may be implemented as any data structure as described above in more detail in reference to FIG. 1. One or more tables contained within credential database 114 may include biometric identifier table 204; biometric identifier table 204 may include one or more biometric identifier 112 pertaining to a user and/or a third party. For instance and without limitation, biometric identifier table 204 may include a user's fingerprint scan or an iris scan identifying a third-party who works at a monetary establishment such as a bank. One or more tables contained within credential database 114 may include transactional monetary account table 208; transactional monetary account table 208 may include authentication information pertaining to a user's bank account number, credit and/or debit account number, and/or personal identification number (PIN). For instance and without limitation, transactional monetary account table 208 may include a bank account number for a user's checking account. One or more tables contained within credential database 114 may include electronic identification credentials table 212; electronic identification credentials table 212 may include authentication information relating to digital certificates. For instance and without limitation, electronic identification credentials table 212 may include a public and private key pair utilized to authenticate and uniquely identify a user and/or a third party. One or more tables contained within credential database 114 may include universal identifier table 216; universal identifier table 216 may include one or more universal identifiers that identify a user and/or a third party. For instance and without limitation, universal identifier table 216 may include a universally unique identifier 112 (UUID) and/or a globally unique identifier 112 (GUID) that uniquely identifies a user and/or a third-party. One or more tables contained within credential database 114 may include demographic table 220; demographic table 220 may include demographic information pertaining to a user and/or a third party such as a user's full legal name, and month, day, and year of birth. For instance and without limitation, demographic table 220 may include a user's full legal name, address, and social security number. One or more tables contained within credential database 114 may include password table 224; password table 224 may include one or more passwords used to authenticate the identity of a user and/or a third party. For instance and without limitation, password table 224 may include a string of characters that that uniquely identify a third party such as a mortgage lender.

Figure 3:
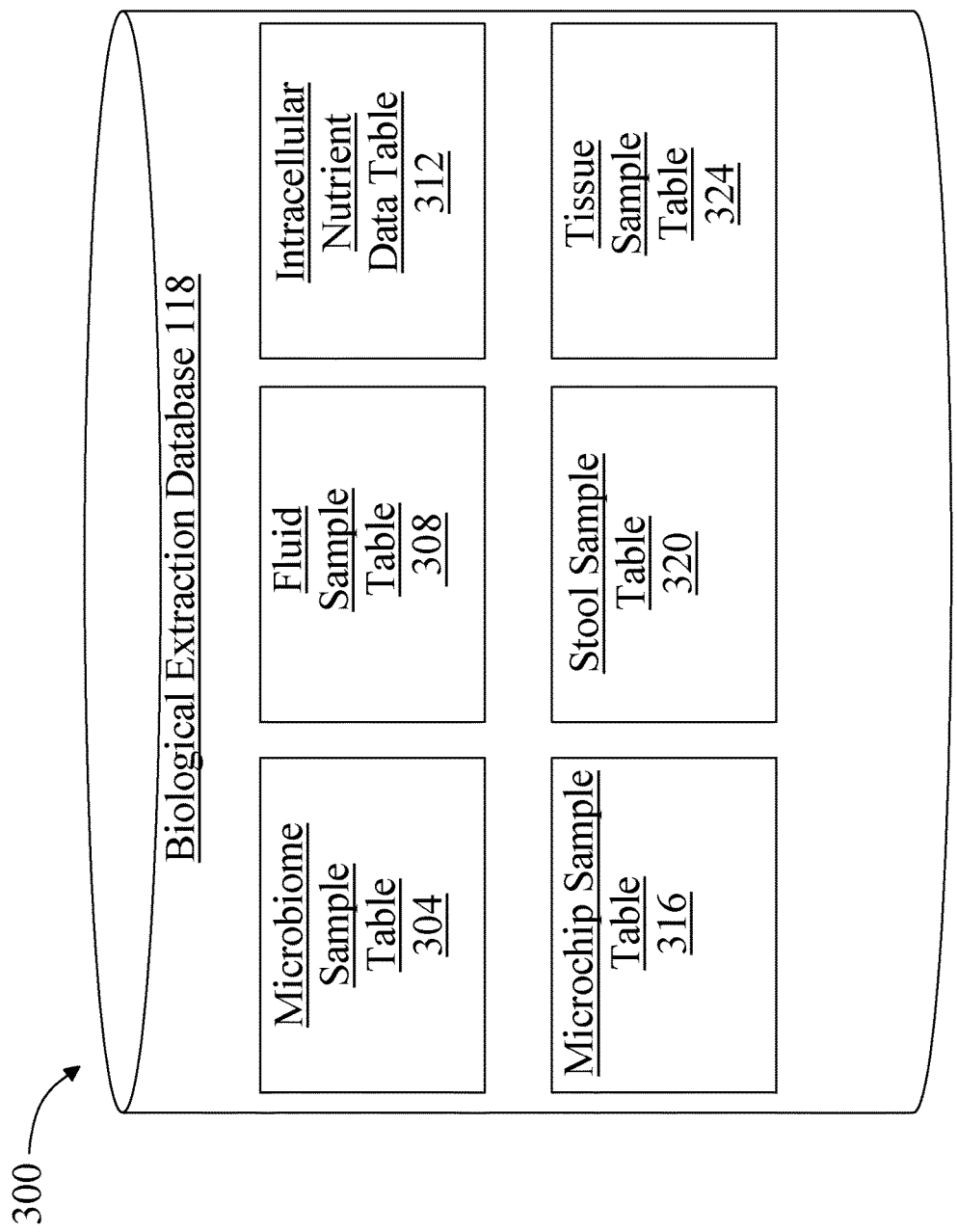
FIG. 3 is a block diagram illustrating an exemplary embodiment of a biological extraction database.

Referring now to FIG. 3, an exemplary embodiment 300 of biological extraction database 118 is illustrated. Biological extraction database 118 may be implemented as a data structure as described above in reference to FIG. 1. Biological extraction database 118 may include one or more elements of physiological data pertaining to a particular user. Physiological data contained within biological extraction database 118 may be organized according to type of biological extraction 116 utilized to analyze a particular element of physiological data, body system or body dimension that a particular element of physiological data pertains to, sample type, category of physiological data and the like. One or more tables contained within biological extraction database 118 may include microbiome sample table 304; microbiome sample table 304 may contain one or more elements of physiological data containing a microbiome sample. For instance and without limitation, microbiome sample table 304 may contain an element of physiological data such as a stool sample analyzed for levels of pathogenic bacteria. One or more tables contained within biological extraction database 118 may include fluid sample table 308; fluid sample table 308 may contain one or more elements of physiological data containing a fluid sample. For instance and without limitation, fluid sample table 308 may include a saliva sample analyzed for one or more hormone levels. One or more tables contained within biological extraction database 118 may include intracellular nutrient data table 312; intracellular nutrient data table 312 may include one or more elements of physiological data containing an intracellular nutrient level. For instance and without limitation, intracellular nutrient data table 312 may include an intracellular level of Vitamin C. One or more tables contained within biological extraction database 118 may include microchip sample table 316; microchip sample table 316 may include one or more elements of physiological data obtained from a microchip. For instance and without limitation, microchip sample table 316 may include one or more extracellular nutrient levels of coenzyme Q 10 obtained from a microchip embedded under the skin. One or more tables contained within biological extraction database 118 may include stool sample table 320; stool sample table 320 may include one or more elements of physiological data obtained from a stool sample. For instance and without limitation, stool sample table 320 may include a measurement of a stool pH level. One or more tables contained within biological extraction database 118 may include tissue sample table 324; tissue sample table 324 may include one or more elements of physiological data obtained from a tissue sample. For instance and without limitation, tissue sample table 324 may include an intestinal biopsy analyzed for the presence or absence of Celiac disease.

Figure 4:
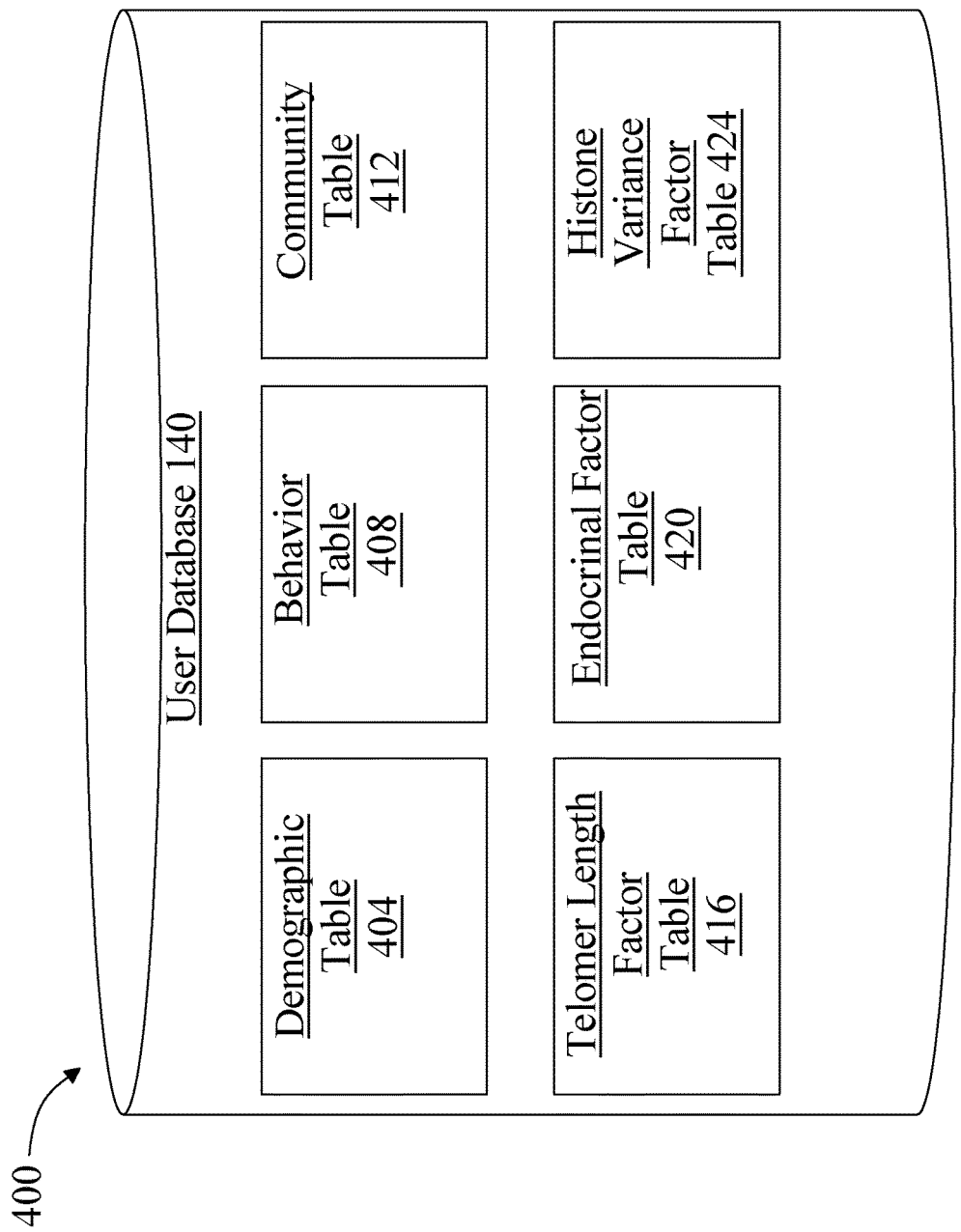
FIG. 4 is a block diagram illustrating an exemplary embodiment of a user database.

Referring now to FIG. 4, an exemplary embodiment 400 of user database 140 is illustrated. User database 140 may be implemented as any data structure suitable for use as credential database 114 as described above in more detail in reference to FIG. 1. One or more tables contained within user database 140 may include demographic table 404; demographic table 404 may include one or more elements of data pertaining to user demographic information. For instance and without limitation, demographic table 404 may include information describing a user's name, address, date of birth, marital status, education, income level, hobbies and the like. One or more tables contained within user database 140 may include behavior table 408; behavior table 408 may include one or more elements of data pertaining to any concurrent and/or previous user behavior relating to any account operation 108. For instance and without limitation, behavior table 408 may include any entry that describes a user's consistent payment on an automobile loan over the past four years. One or more tables contained within user database 140 may include community table 412; community table 412 may include data describing behavior that indicates a user's integration and engagement with local community. For instance and without limitation, community table 412 may include data that describes a user's social integration and support systems. One or more tables contained within user database 140 may include telomer length factor table 416; telomer length factor table may include one or more data entries containing a user's telomer length. One or more tables contained within user database 140 may include endocrinal factor table 420; endocrinal factor table 420 may include one or more data entries containing one or more endocrinal factors relating to a user. One or more tables contained within user database 140 may include histone variance factor table 424; histone variance factor table 424 may include one or more data entries containing one or more histone variance factors relating to a user.

Figure 5:
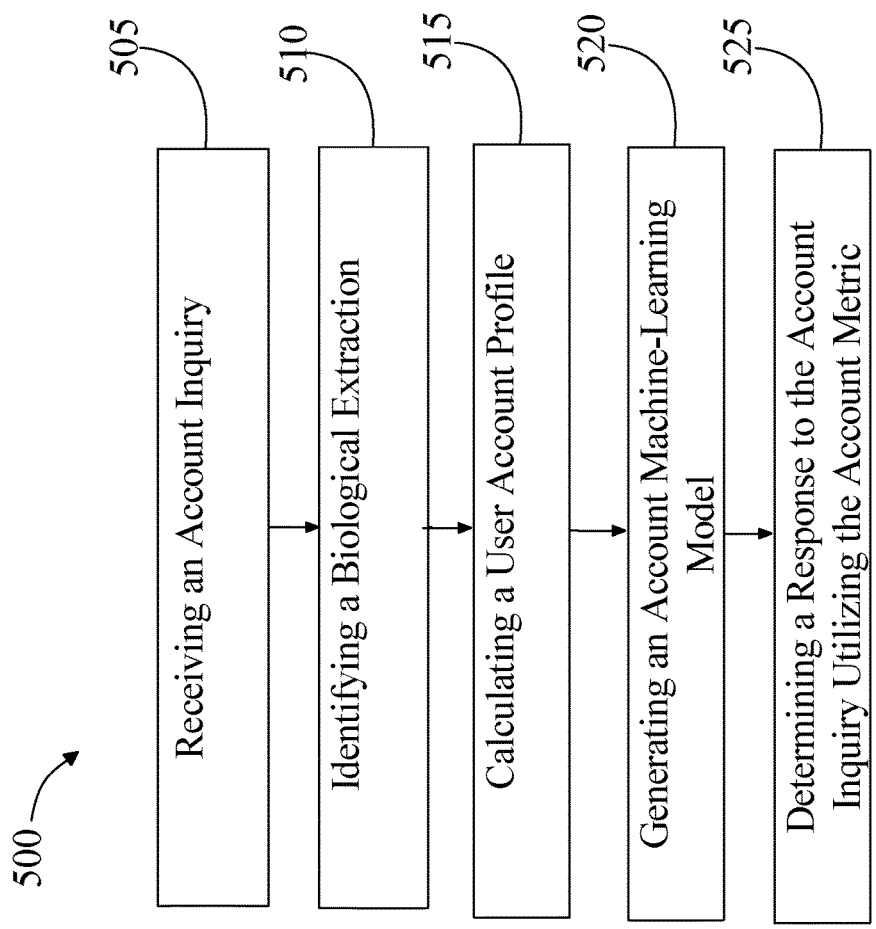
FIG. 5 is a process flow diagram illustrating an exemplary embodiment of a method of physiologically informed account metrics.

Referring now to FIG. 5, an exemplary embodiment 500 of a method of physiologically informed account metric 146 is illustrated. At step 505, a computing device receives from a remote device 104 operated by a third party an account inquiry 106. An account inquiry 106 includes data describing any current and/or future agreement or communication carried out between a buyer and a seller to trade an asset for payment, as described above in more detail in reference to FIG. 1. An account inquiry 106 may contain a question asking how much money a user is approved to finance on a car loan. In yet another non-limiting example, an account inquiry 106 may contain an inquiry as to how much money a user is approved to mortgage on a house. An account inquiry 106 may contain a request for a particular type of loan and dollar amount such as a title loan, a pawn shop loan, a payday loan, a home equity loan, a credit card cash advance loan and the like. An account inquiry 106 is received from a remote device 104 operated by a third party. A remote device 104 includes any of the remote device 104 as described above in reference to FIG. 1. A third party includes any party other than a user who is and/or who may become involved in a fiscal transaction with the user as described above in more detail in reference to FIG. 1. A third party may include a mortgage lender, or a monetary institution such as a bank. A third party may include a mortgage banker, a direct lender such as a bank or credit union, and/or a secondary lender. A third party may include an employee authorized to act on behalf of a corporation and/or limited liability company such as a bank, credit union, retail store, brick and mortar store, electronic store and the like.

With continued reference to FIG. 5, account inquiry 106 identifies a particular user and an account operation 108 related to the particular user. A particular user, identifies any human being who is seeking to enter into any monetary transaction with a third-party. For example, an account inquiry 106 may identify a particular user who is seeking to obtain financing for a car loan from a credit union. In yet another non-limiting example, an account inquiry 106 may identify a particular user who is seeking to open a new credit card with a bank. In yet another non-limiting example, an account inquiry 106 may identify a particular user who is seeking to make a purchase at a retail store with a credit card issued by a major credit card company. An account inquiry 106 identifies an account operation 108. An account operation 108 describes any previous, current, and/or proposed monetary agreement between a particular user and a third-party. For example, an account operation 108 may identify a particular user as having a checking and saving account with a specific bank. In yet another non-limiting example, an account operation 108 may identify a particular user as having applied for a line of credit from a particular credit union. In yet another non-limiting example, an account operation 108 may identify a particular user has currently having a mortgage with a particular mortgage lender.

With continued reference to FIG. 5, computing device 102 authenticates an account inquiry 106. Computing device 102 may authenticate an account inquiry 106 to confirm the identify of a particular user and/or a third party contained within an account inquiry 106. Computing device 102 authenticates an account inquiry 106 by transmitting to a remote device 104 operated by a third party, an authentication request 110. Computing device 102 may transmit an authentication request 110 utilizing any network methodology as described herein. An authentication request 110 is any request to prove an assertion, including the identity of a third-party remote device 104 and/or a particular user as described above in more detail in reference to FIG. 1. An authentication request 110 may contain a request for a knowledge factor such as a security token. An authentication request 110 may contain a request for an inherence factor that may contain a request for a biometric identifier 112 of a user and/or a third party such as a fingerprint scan, iris scan, palm scan, and the like. Computing device 102 receives from a remote device 104 an identifier 112 of a particular user. An identifier 112 includes any of the identifier 112 as described above in reference to FIG. 1. An identifier 112 may be utilized by computing device 102 to authenticate the identity of a particular user and/or a third party. An identifier 112 may include a universal identification number (UIN) of a user or a global identification number (GIN) of a user. An identifier 112 may include a user's social security number. Computing device 102 validates an identifier 112 of a particular user. Computing device 102 may validate an identifier 112 of a particular user by comparing a received identifier 112 to one or more identifier 112 stored within credential database 114. For example, computing device 102 may compare a biometric identifier 112 such as a user's iris scan to a stored iris scan of the user contained within credential database 114. In yet another non-limiting example, computing device 102 may compare a transactional monetary account number such as a user's checking account number to a stored checking account number contained within credential database 114. In yet another non-limiting example, computing device 102 may authenticate a public and private key pair identifying a third party such as a bank to a stored public and private key pair related to the third party contained within credential database 114.

With continued reference to FIG. 5, computing device 102 identifies a biological extraction 116 related to a particular user. Computing device 102 may store one or more biological extraction 116 within biological extraction database 118. A biological extraction 116 includes any of the biological extraction 116 as described above in reference to FIG. 1. A biological extraction 116 contains at least an element of user physiological data as described above in reference to FIG. 1. Computing device 102 may identify a biological extraction 116 related to a particular user utilizing any of the authentication measurements as described above. For example, computing device 102 may authenticate an identifier 112 of a particular user stored within credential database 114 to an identifier 112 contained within biological extraction database 118.

With continued reference to FIG. 5, computing device 102 is configured to calculate a user account profile 120 utilizing a user biological extraction 116. A user account profile 120 includes any of the user account profile 120 as described above in reference to FIG. 1. A user account profile 120 includes at least an element of user behavior data 122 and at least an element of user hazard data 128. An element of user behavior data 122 includes describes any concurrent and/or previous user behavior relating to any previous, current, and/or future account operation 108. For instance and without limitation, an element of user behavior data 122 may describe a user's previous on time monthly payments for an automobile loan. In yet another non-limiting example, an element of user behavior data 122 may describe a user's current missed payments on mortgage installment. Computing device 102 may identify an element of user behavior data 122 utilizing account classifier 124. Computing device 102 receives a plurality of data entries containing at least an element of data pertaining to a previous user account operation 108. For instance and without limitation, data entries may describe any previous loans, mortgages, credit card charges, liens, and the like that the user was a party to. Computing device 102 classifies a plurality of data entries to a behavior pattern 126. Account classifier includes any of the account classifier 124 as described above in more detail in reference to FIG. 1. Account classifier 124 utilizes an element of user account operation 108 as an input and outputs a behavior pattern 126. Account classifier 124 may generate a classification algorithm. Classification algorithm includes any of the classification algorithms as described above in more detail in reference to FIG. 1. A behavior pattern 126 indicates the creditworthiness of a particular user by reflecting how likely the particular user is to repay debts. Account classifier 124 may output a behavior pattern 126 that contains a label indicating the creditworthiness of a particular user generated by classification algorithm. Computing device 102 identifies an element of user behavior data 122 utilizing output behavior pattern 126. In an embodiment, computing device 102 may identify an element of user behavior data 122 where the element of user behavior data 122 may include the output behavior pattern 126. In yet another non-limiting example, computing device 102 may identify an element of user behavior data 122 where the element of user behavior data 122 may include an indication as to the creditworthiness of a particular user such as a label indicating the creditworthiness.

With continued reference to FIG. 5, computing device 102 is configured to calculate a user account profile 120 that contains at least an element of user hazard data 128. An element of user hazard data 128 is data describing a user's predisposition to monetary risk 130 based on a user's biological extraction 116 as described above in more detail in reference to FIG. 1. Computing device 102 identifies an element of user hazard data 128 utilizing a hazard machine-learning model 136. Computing device 102 retrieves a second biological extraction 116 related to a particular user. Second biological extraction may be stored within biological extraction database 118. Computing device 102 receives hazard training data 132. Hazard training data 132 includes any of the hazard training data 132 as described above in more detail in reference to FIG. 1. Hazard training data 132 includes a plurality of biological extraction 116 and a plurality of hazard label 134. Hazard label 134 indicate a user's predisposition to monetary risk 130 based on a user's biological extraction 116. A hazard label 134 may describe a user's predisposition to monetary risk 130 based on a continuum. For instance and without limitation, a biological extraction 116 showing a mutation to 7R dopamine receptor D4 gene (DRD4), may cause computing device 102 to generate a hazard label 134 that indicates a user has a high predisposition to monetary risk 130 while a user who does not have a mutation to DRD4 gene may indicate that a user does not have a high predisposition to monetary risk 130. Computing device 102 generates hazard machine-learning model 136 utilizing any of the machine-learning algorithms as described above more detail in reference to FIG. 1. Hazard machine-learning model 136 utilizes a second biological extraction 116 related to a particular user as an input and outputs a hazard label 134. For example, computing device 102 may generate hazard machine-learning model 136 as a supervised machine-learning model. In yet another non-limiting example, computing device 102 may generate hazard machine-learning model 136 as an unsupervised machine-learning model. Computing device 104 identifies an element of user hazard data 128 utilizing a hazard label 134. In an embodiment, an element of user hazard data 128 may be a hazard label 134. In an embodiment, a hazard label 134 may include textual and/or numerical data indicating a user's predisposition to monetary risk 130. In such an instance, such data may be identified by computing device 102 as an element of user hazard data 128.

With continued reference to FIG. 5, computing device 102 may calculate a user account profile 120 to contain an element of user personal profile information 138. User personal profile information includes any of the personal profile information as described above in more detail in reference to FIG. 1. Personal profile information may describe behaviors associated with a user such as any concurrent and/or previous behavior relating to any other fiscal inquiries and/or account operation 108. Personal profile information may describe any community behaviors, including a user's ties to the local community and any social integration and support systems that the user is engaged upon. One or more elements of user personal profile information may be stored within user database 140. Computing device 102 calculates a user account profile 120 to contain at least an element of user personal profile information 138.

With continued reference to FIG. 5, computing device 102 is configured to calculate a user account profile 120 to contain a user account score 142. A user account score 142 includes any of the user account score 142 as described above in more detail in reference to FIG. 1. A user account score 142 may include an account history factor, an outstanding account factor, an account length factor, and an account type factor. For instance and without limitation, computing device 102 may calculate a user account score 142 that reflects an account history factor that shows a user has routinely made payments on his credit card on time, an outstanding account factor that shows a user does not have any outstanding debts except for a mortgage on user's house, an account length factor that indicates a user has had a bank account with the same bank for the past sixteen years, and an account type factor that indicates the user currently has a loan on user's house, car, and a home equity loan.

With continued reference to FIG. 5, at step 520 computing device 102 is configured to generate an account machine-learning model 144. Account machine-learning model 144 includes any of the machine-learning models as described above in more detail in reference to FIG. 1. Account machine-learning model 144 utilizes a fiscal profile as an input and outputs an account metric 146. Account metric 146 includes any textual, pictorial, and/or character data that reflects the monetary well-being and/or monetary stability of a particular user as described above in more detail in reference to FIG. 1. Computing device 102 generates an account machine-learning model 144 utilizing account training data 148. Account training data 148 includes any of the account training data 148 as described above in more detail in reference to FIG. 1. Account training data 148 includes a plurality of fiscal profiles and a plurality of correlated account metric 146. Computing device 102 generates account machine-learning model 144 utilizing account training data 148 and a first machine-learning algorithm. First machine-learning algorithm includes any of the machine-learning algorithms as described above in more detail in reference to FIG. 1. For instance and without limitation, a first machine-learning algorithm may include a lazy learning algorithm.

With continued reference to FIG. 5, at step 525 computing device 102 is configured to determine a response 150 to an account inquiry 106 utilizing an account metric 146. A response 150 includes any of the response 150 as described above in more detail in reference to FIG. 1. Computing device 104 may determine a response 150 to an account inquiry 106 based on a user effective age 152. User effective age 152 may be calculated utilizing the calculations as described above in more detail in reference to FIG. 1. Computing device 102 calculates a user effective age 152 using a user chronological age and a user biological extraction 116. Computing device 102 determines a response 150 to an account inquiry 106 utilizing an account metric 146 and a user effective age 152. For instance and without limitation, a user effective age 152 may reflect that a user who is 47 years old has a user effective age 152 of a 25 year old. In such an instance, computing device 102 may determine a response 150 to an account inquiry 106 that contains a request for approval for a twenty five year mortgage and approve the mortgage as the user is likely to be alive for the duration of the twenty five year mortgage. In yet another non-limiting example, computing device 102 may determine a response 150 to an account inquiry 106 such as a request for a $50,000 credit card purchase that does not approve the transaction based on the user's account metric 146 that indicates the user has excess dopamine and has a history of impulsive monetary decisions and has a chronological age of 75 and an effective age of 84. Computing device 102 is configured to determine that an account inquiry 106 is in excess of an account metric 146 and deny an account inquiry 106. For instance and without limitation, computing device 102 may determine that an account inquiry 106 for a $2800 credit card purchase is in excess of an account metric 146 that shows a user lives paycheck to paycheck and has $1000 in a savings account. In yet another non-limiting example, computing device 102 may determine that an account inquiry 106 for a $950,000 second mortgage is in excess of an account metric 146 that shows a user has $100,000 in a checking account and saves only 2% of the user's annual income of $40,000. Computing device 102 is configured to determine that an account inquiry 106 does not exceed an account metric 146 and approve an account inquiry 106. For instance and without limitation, computing device 102 may determine that an account inquiry 106 for a $5000 purchase does not exceed an account metric 146 that shows a user has made one time payments on a home mortgage over the past three years and the user has $25,000 in a savings account. In yet another non-limiting example, computing device 102 may determine that an account inquiry 106 for a $75,000 car loan does not exceed an account metric 146 that shows a user has a steady income and made $85,000 the previous year. In such an instance, computing device 102 may approve an account inquiry 106.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 6:
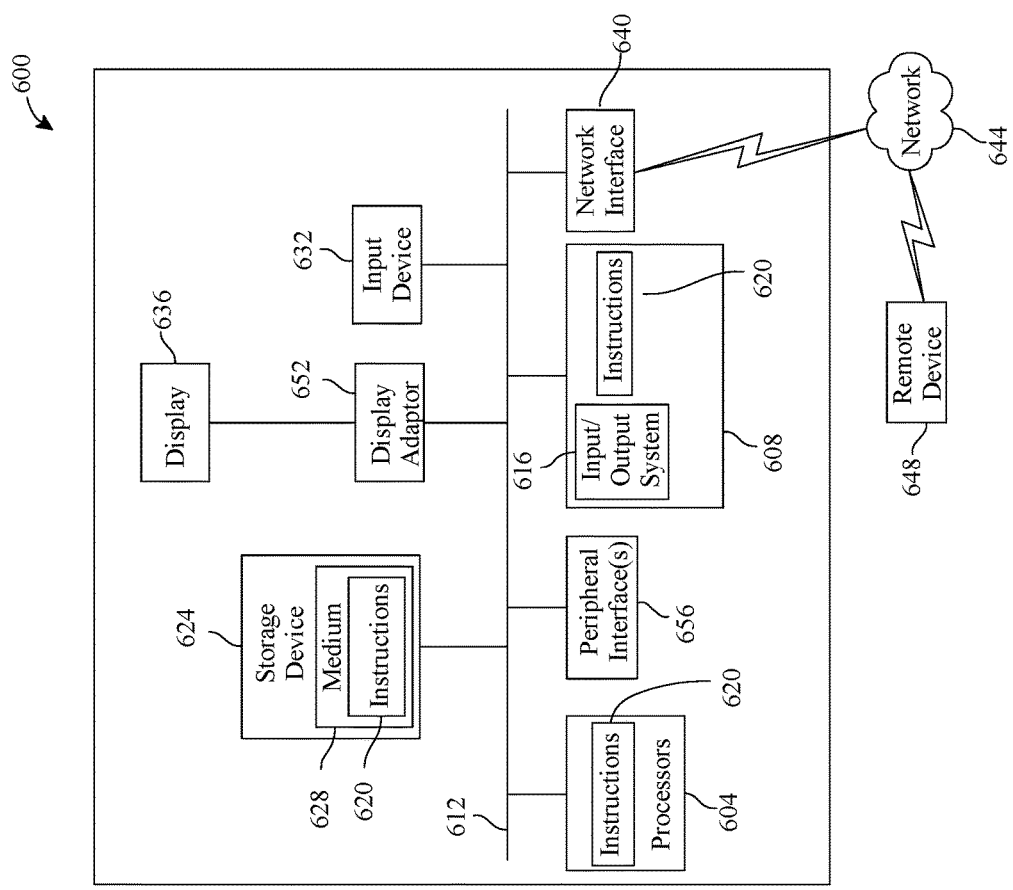
FIG. 6 is a block diagram of a computing system that can be used to implement any one or more of the methodologies disclosed herein and any one or more portions thereof.

FIG. 6 shows a diagrammatic representation of one embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Memory 608 may include various components (e.g., machine-readable media) including, but not limited to, a random access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIREWIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote device 104 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for physiologically informed account metrics utilizing artificial intelligence, the system comprising a computing device, the computing device designed and configured to:
   receive, from a remote device, an account inquiry, wherein the account inquiry identifies a particular user and an account operation related to the particular user;
   identify a biological extraction related to the particular user, wherein the biological extraction further comprises at least an element of user physiological data;
   calculate a user account profile utilizing the user biological extraction, wherein the user account profile contains at least an element of user behavior data and at least an element of user hazard data, wherein in hazard data describes a user's predisposition to monetary risk based on a user's biological extraction;
   generate an account machine-learning model, wherein the account machine-learning model utilizes the user account profile as an input and outputs an account metric; and
   determine a response to the account inquiry utilizing the account metric.

2. The system of claim 1, wherein the computing device is further configured to authenticate the account inquiry, wherein authenticating the account inquiry further comprises:
   transmitting, to the remote device, an authentication request;
   receiving, from the remote device, an identifier of the particular user; and
   validating the identifier of the particular user.

3. The system of claim 1, wherein the computing device is further configured to:
   receive a plurality of data entries, each data entry of the plurality of data entries containing at least an element of data pertaining to a previous user account operation;
   classify, using an account classifier, the plurality of data entries to a behavior pattern, wherein the account classifier utilizes the previous user account operation as an input and outputs the behavior pattern by executing a classification algorithm; and
   identify the element of user behavior data utilizing the behavior pattern.

4. The system of claim 1, wherein the computing device is further configured to:
   retrieve a second biological extraction related to the particular user;
   receive hazard training data, wherein hazard training data further comprises a plurality of biological extractions and a plurality of hazard labels;
   generate a hazard machine-learning model using the hazard training data, wherein the hazard machine-learning model utilizes the second biological extraction related to the particular user an input and outputs a hazard label; and
   identify the element of user hazard data utilizing the hazard label.

5. The system of claim 1, wherein the computing device is further configured to:
   retrieve at least an element of user personal profile information; and
   calculate the user account profile to contain the at least an element of user personal profile information.

6. The system of claim 1, wherein the computing device is further configured to calculate the user account profile to contain a user account score, wherein the user account score further comprises an account history factor, an outstanding account factor, an account length factor, and an account type factor.

7. The system of claim 1, wherein the computing device is further configured to:
   receive account training data wherein the account training data further comprises a plurality of account profiles and a plurality of correlated account metrics; and generate the account machine-learning model utilizing the account training data and a first machine-learning algorithm.

8. The system of claim 1, wherein the computing device is further configured to:
calculate a user effective age wherein the user effective age is calculated from a user chronological age and a user biological extraction; and
determine the response to the account inquiry utilizing the account metric and the user effective age.

9. The system of claim 1, wherein the computing device is further configured to determine that the account inquiry does not satisfy the account metric and deny the account inquiry.

10. The system of claim 1, wherein the computing device is further configured to determine that the account inquiry satisfies the account metric and approve the account inquiry.

11. A method of physiologically informed account metrics utilizing artificial intelligence, the method comprising:
receiving, by a computing device, an account inquiry, wherein the account inquiry identifies a particular user and an account operation related to the particular user;
identifying by the computing device, a biological extraction related to the particular user, wherein the biological extraction further comprises at least an element of user physiological data;
calculating by the computing device, a user account profile utilizing the user biological extraction, wherein the user account profile contains at least an element of user behavior data and at least an element of user hazard data, wherein in hazard data describes a user's predisposition to monetary risk based on a user's biological extraction;
generating by the computing device, an account machine-learning model wherein the account machine-learning model utilizes the user account profile as an input and outputs an account metric; and
determining by the computing device, a response to the account inquiry utilizing the account metric.

12. The method of claim 11, wherein receiving the account inquiry further comprises:
authenticating the account inquiry wherein authenticating the account inquiry further comprises:
transmitting, to the remote device, an authentication request;
receiving, from the remote device, an identifier of the particular user; and
validating the identifier of the particular user.

13. The method of claim 11, wherein calculating the user account profile further comprises:
receiving a plurality of data entries, each data entry of the plurality of data entries containing at least an element of data pertaining to a previous user account operation;
classifying, using an account classifier, the plurality of data entries to a behavior pattern, wherein the account classifier utilizes the previous user account operation as an input and outputs the behavior pattern by executing a classification algorithm; and
identifying the element of user behavior data utilizing the output behavior pattern.

14. The method of claim 11, wherein calculating the user account profile further comprises:
retrieving a second biological extraction related to the particular user;
receiving hazard training data wherein hazard training data further comprises a plurality of biological extractions and a plurality of hazard labels;
generating a hazard machine-learning model using the hazard training data, wherein the hazard machine-learning model utilizes the second biological extraction related to the particular user an input and outputs a hazard label; and
identifying the element of user hazard data utilizing the hazard label.

15. The method of claim 11, wherein calculating the user account profile further comprises:
retrieving at least an element of user personal profile information; and
calculating the user account profile to contain the at least an element of user personal profile information.

16. The method of claim 11, wherein calculating the user account profile further comprises calculating a user account profile to contain a user account score, wherein the user account score further comprises an account history factor, an outstanding account factor, an account length factor, and an account type factor.

17. The method of claim 11, wherein generating the account machine-learning model further comprises:
receiving account training data wherein the account training data further comprises a plurality of account profiles and a plurality of correlated account metrics; and
generating the account machine-learning model utilizing the account training data and a first machine-learning algorithm.

18. The method of claim 11, wherein determining the response to the account inquiry further comprises:
calculating a user effective age wherein the user effective age is calculated from a user chronological age and a user biological extraction; and
determining the response to the account inquiry utilizing the account metric and the user effective age.

19. The method of claim 11, wherein determining the response to the account inquiry further comprises determining that the account inquiry does not satisfy the account metric and deny the account inquiry.

20. The method of claim 11, wherein determining the response to the account inquiry further comprises determining that the account inquiry satisfies the account metric and approve the account inquiry.

* * * * *